US012799908B2

(12) United States Patent
Loboda et al.

(10) Patent No.: US 12,799,908 B2
(45) **Date of Patent: *Nov. 17, 2026**

(54) RADIAL IN-FLOW PARTICLE BED NUCLEAR ROCKET ENGINE AND METHOD

(71) Applicant: Dark Fission Space Systems Inc., Huntington Beach, CA (US)

(72) Inventors: Gregory George Loboda, Huntington Beach, CA (US); Fred George William Kennedy, III, Hillsboro, VA (US); Michael Gordon Jacox, Magnolia, TX (US)

(73) Assignee: Dark Fission Space Systems Inc., Huntington Beach, CA (US)

( * ) Notice: Subject to any disclaimer, the term of this patent is extended or adjusted under 35 U.S.C. 154(b) by 122 days.

This patent is subject to a terminal disclaimer.

(21) Appl. No.: 18/973,883

(22) Filed: Dec. 9, 2024

(65) Prior Publication Data

US 2026/0117726 A1 Apr. 30, 2026

Related U.S. Application Data

(63) Continuation of application No. 18/233,765, filed on Aug. 14, 2023, now Pat. No. 12,234,792.

(Continued)

(51) Int. Cl.

| | |
|---|---|
| ***F02K 9/42*** | (2006.01) |
| ***B64G 1/40*** | (2006.01) |
| ***G21C 1/06*** | (2006.01) |
| ***G21C 7/28*** | (2006.01) |
| ***G21C 15/06*** | (2006.01) |

(Continued)

(52) U.S. Cl.

CPC ................ *F02K 9/42* (2013.01); *B64G 1/408* (2013.01); *G21C 1/06* (2013.01); *G21C 7/28* (2013.01); *G21C 15/06* (2013.01); *G21C 15/08* (2013.01); *G21C 15/10* (2013.01); *G21D 5/02* (2013.01)

(58) Field of Classification Search

CPC ................ F02K 9/42; G21C 1/06; G21D 5/02

See application file for complete search history.

(56) References Cited

U.S. PATENT DOCUMENTS 3,108,054 A * 10/1963 Blackman, Jr. .......... G21D 5/02 165/84
3,168,807 A * 2/1965 Ledwith .................. G21D 5/02 60/233

(Continued)

*Primary Examiner* — Lorne E Meade

(74) *Attorney, Agent, or Firm* — Run8 Patent Group, LLC; Peter Miller

(57) ABSTRACT

A method includes: during a first time period, pumping propellant: to a set of moderator coolant channels to cool the moderator; through a set of fuel elements to heat the propellant to a first outlet temperature; out of a thrust nozzle to produce a first thrust; and locating the reflector at a first closed position to reflect neutrons toward the set of fuel elements to maintain a fission rate of the set of fuel elements above a threshold fission rate. Additionally, during a second time period: locating the reflector at a second open position to reduce the fission rate of the set of fuel elements to below the threshold fission rate; and pumping the propellant through the fuel elements to heat the propellant to a second outlet temperature less than the first outlet temperature and out of the thrust nozzle to produce a second thrust less than the first thrust.

2 Claims, 16 Drawing Sheets

Related U.S. Application Data

(60) Provisional application No. 63/371,492, filed on Aug. 15, 2022.

(51) Int. Cl.

*G21C 15/08* (2006.01)
*G21C 15/10* (2006.01)
*G21D 5/02* (2006.01)

(56) References Cited

U.S. PATENT DOCUMENTS

| | | | | | |
|---|---|---|---|---|---|
| 3,286,468 | A * | 11/1966 | Plebuch | G21D 5/02 376/318 |
| 3,336,749 | A * | 8/1967 | Rom | G21D 5/02 976/DIG. 82 |
| 3,793,832 | A * | 2/1974 | Moon | G21D 5/02 376/385 |
| 5,475,722 | A * | 12/1995 | Culver | G21D 5/02 376/386 |
| 5,873,239 | A * | 2/1999 | Culver | G21D 5/02 376/318 |
| 12,234,792 | B1 * | 2/2025 | Loboda | B64G 1/408 |
| 12,410,766 | B1 * | 9/2025 | Loboda | B64G 1/408 |
| 2017/0263345 | A1 * | 9/2017 | Venneri | B64G 1/408 |
| 2021/0304909 | A1 * | 9/2021 | Gramlich | G21C 17/102 |
| 2022/0328202 | A1 * | 10/2022 | Venneri | B64D 27/22 |

* cited by examiner

RADIAL IN-FLOW PARTICLE BED NUCLEAR ROCKET ENGINE AND METHOD

CROSS-REFERENCE TO RELATED APPLICATIONS

This Application is a continuation application of U.S. patent application Ser. No. 18/233,765, filed on 14 Aug. 2023, which claims the benefit of U.S. Provisional Patent Application No. 63/371,492, filed on 15 Aug. 2022, which is incorporated in its entirety by this reference.

TECHNICAL FIELD

This invention relates generally to the field of nuclear thermal rocket propulsion and more specifically to a new and useful radial in-flow particle fuel bed reactor and an associated engine cycle of a nuclear thermal rocket propulsion system.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

Figure 1:
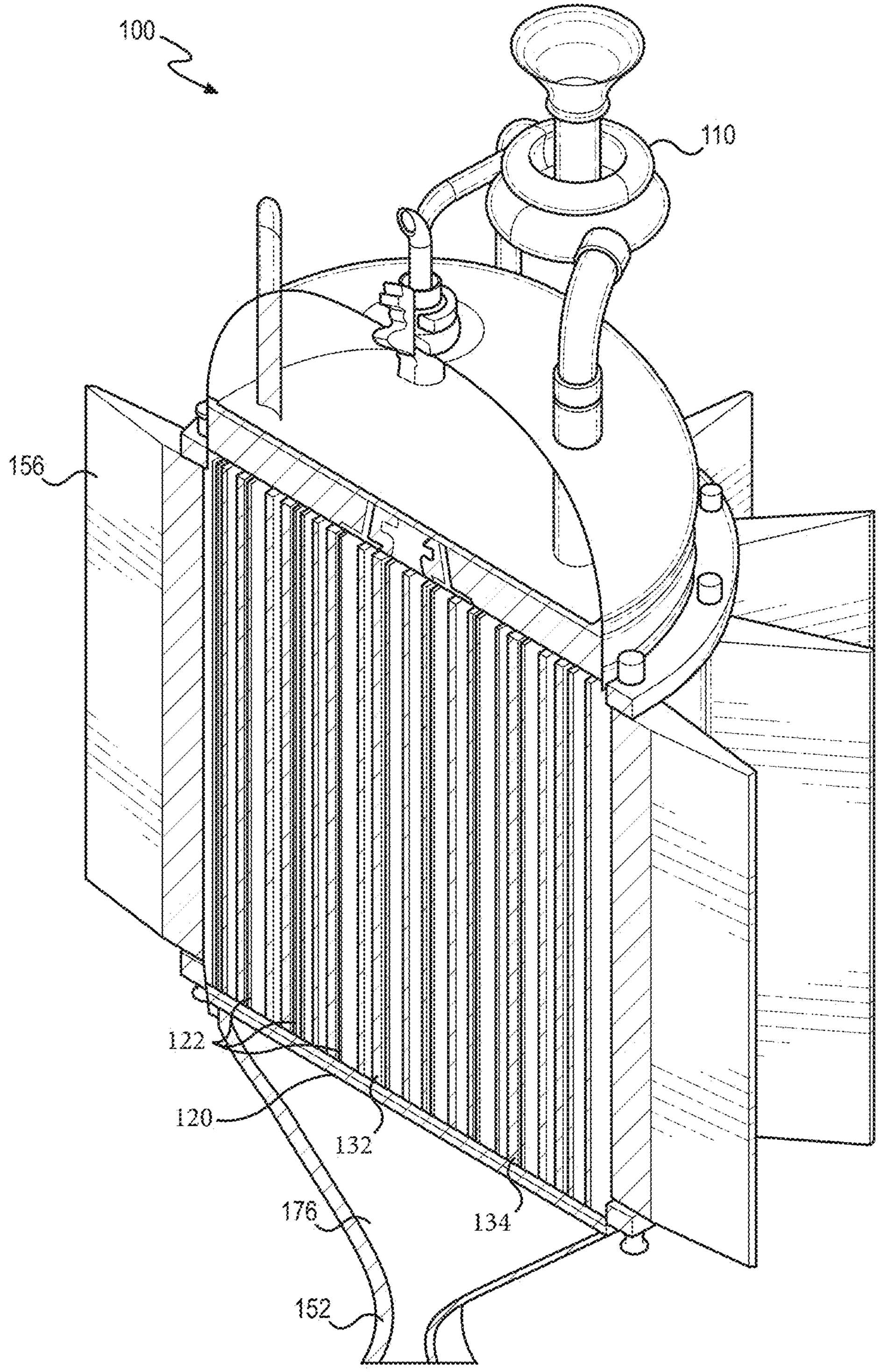
FIG. 1 is a representation of a rocket including one variation of a nuclear engine system.

As shown in FIG. 1, an engine system 100 includes: a pump; a reactor assembly; a reflector; a thrust chamber; and an exhaust nozzle.

The pump 110 is configured to pump propellant throughout the engine system 100.

The reactor assembly 120 includes a set of fuel elements 122 and a moderator 132. Each fuel element 122 in the set of fuel elements 122 includes a set of low enriched uranium fuel particles defining a set of interstitial volumes through which the pump 110 pumps the propellant. The moderator 132 defines a set of fuel bores, each fuel bore: fluidly coupled to a warm propellant inflow manifold; occupied by a fuel element; and configured to direct warm propellant axially downward from the warm propellant inflow manifold along a length of the fuel element. The moderator 132 additionally defines a set of moderator coolant channels, each moderator coolant channel: fluidly isolated from the set of fuel bores; defining a set of moderator coolant inlets fluidly coupled to the thrust-coolant valve; defining a set of moderator coolant outlets fluidly coupled to the pump bypass valve; and configured to pass propellant through the moderator to cool the moderator.

The reflector 156 is arranged on a perimeter of the reactor assembly 120 and includes: a neutron-reflecting material; and a reflector coolant channel arranged within the reflector configured to exchange thermal energy with propellant pumped through the reflector coolant channel. The reflector 156 is operable in: a first position, the reflector defining a first cross-section of the neutron-reflecting material facing the fuel elements in the first position and reflecting incident neutrons toward the fuel elements at a first rate; and a second position, the reflector defining a second cross-section of the neutron-reflecting material facing the fuel elements in the second position and reflecting incident neutrons toward the fuel elements at a second rate, the second cross-section less than the first cross-section, the second rate less than the first rate.

The thrust nozzle 152: is configured to accelerate and expel propellant to produce thrust; and includes a nozzle coolant channel arranged within a wall of the thrust nozzle configured to exchange thermal energy with propellant pumped through the nozzle coolant channel.

1.1 Variation: Fuel Element Geometry

In one variation, each fuel element defines a cylindrical geometry of concentric layers including: a cold shell defining a first array of perforations configured to direct the propellant radially through the cold shell; a fuel bed containing the set of low enriched uranium fuel particles; a hot shell defining a second array of perforations configured to direct the propellant radially through the hot shell; and an interior chamber configured to direct propellant axially out of the fuel element toward the nozzle.

1.1.1 Variation: Reflector

In another variation, the reflector 156 of the engine system 100 is operable in a closed position and in an open position (and in intermediate positions between the closed and open configurations).

In the closed position, the reflector 156 occupies a shallow angle (e.g., less than 5°) relative to a tangent of the perimeter of the reactor assembly 120 such that a widest cross-section of a neutron-reflective region of the reflector (e.g., a solid beryllium surface; a matrix of beryllium oxide pellets) faces the set of fuel elements 122 and reflects a first proportion of neutrons—emitted by the set of nuclear fuel particles within the set of fuel elements 122 as a product of nuclear fission—back into the set of fuel elements to increase a frequency of neutron-neutron collisions within the reactor assembly 120 and thus increase a rate of fission within the fuel elements.

In the open position, the reflector 156: occupies a wide angle (e.g., approximately 90°) relative to the tangent of the perimeter of the reactor assembly 120 such that a narrowest cross-section of the neutron-reflective region of the reflector faces the set of fuel elements 122; and reflects a second proportion of neutrons—much less (e.g., 80% less) than the first proportion of neutrons—back into the set of fuel elements to reduce a frequency of neutron-neutron collisions within the set of fuel elements 122 and thus reduce a rate of fission within the reactor assembly to subcritical levels.

1.2 Applications

Generally, an engine system 100 within a nuclear rocket includes: a pump; a set of fuel elements 122; a moderator 132; a neutron reflector; and a thrust nozzle. The pump 110 pumps propellant through the engine system 100 to: cool components of the engine system 100 with low temperature propellant; heat propellant to an exhaust temperature by directing it through the set of fuel elements; and produce thrust by expelling high temperature propellant through the thrust nozzle.

The engine system includes reactor assembly 120 including a set of fuel elements 122 arranged within a moderator 132. Each fuel element 122 includes: a cold shell 124; a fuel bed 128; and a hot shell 126. The cold shell 124 and the hot shell 126 each include perforations configured to direct a flow of propellant radially inward from the moderator 132, through the cold shell 124, through the fuel bed 128, and through the hot shell 126 to a fuel element outlet 130. The fuel bed 128 includes a set of nuclear fuel particles that define a set of interstitial volumes through which the propellent flows. As propellant flows through the interstitial volumes of the fuel bed 128, the propellant absorbs thermal energy from the fission reaction occurring at the nuclear fuel particles. The propellant thereby cools the nuclear fuel particles within the fuel bed 128 and absorbs thermal energy to produce thrust. The radial flow of propellant into each fuel element 122 allows the engine system 100 to heat a large volume of propellant from as low as 30K to as high as 3000K over a flow path of one to four centimeters.

Figure 3:
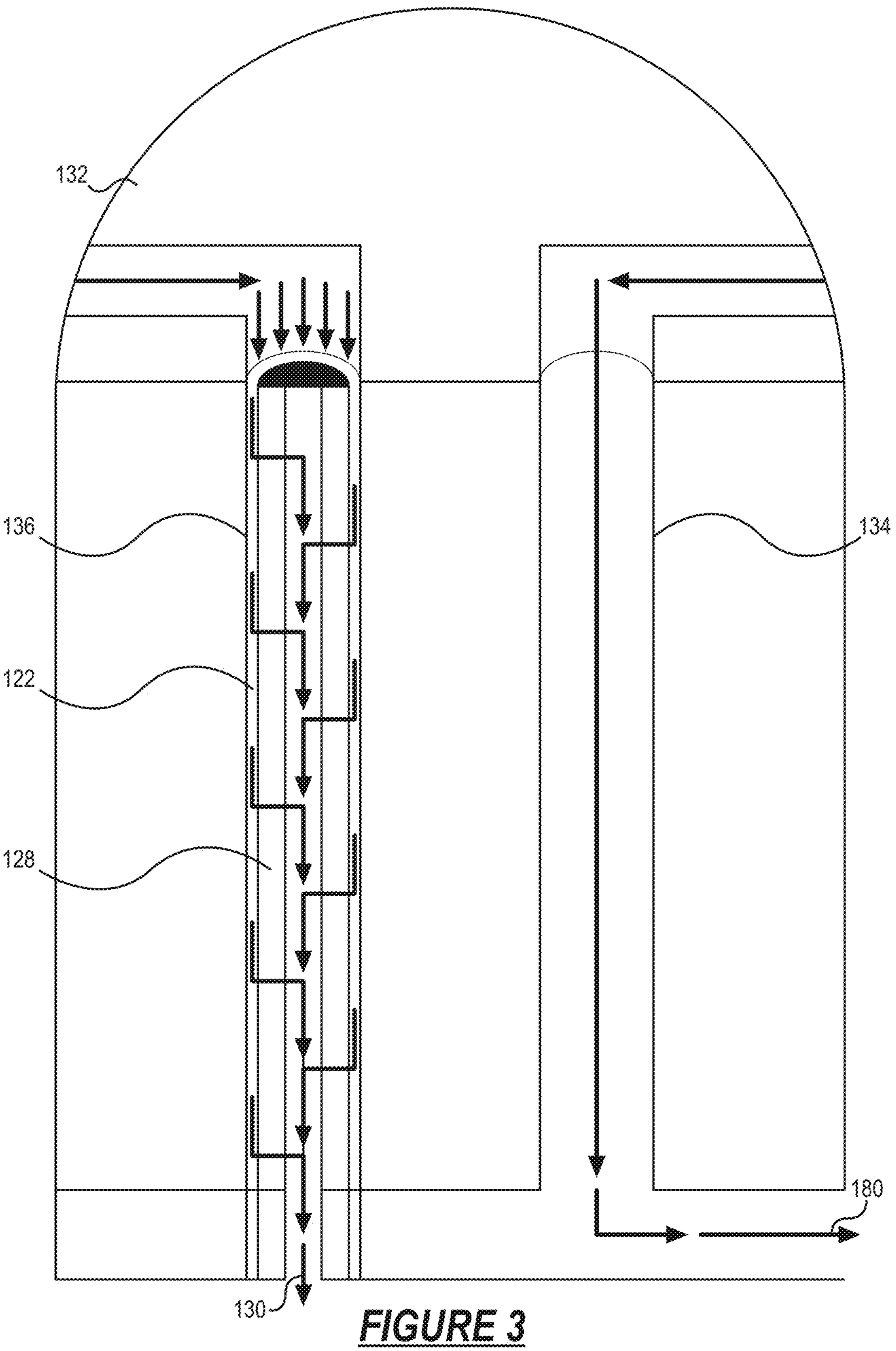
FIG. 3 is a representation of one variation of the nuclear engine system.

The nuclear rocket is configured to complete hundreds of trips through space, such as to ferry a payload (e.g., supplies for space missions) between celestial bodies including planets, moons, and space stations. To produce thrust, the components of the engine system 100 can reach temperatures of 3000K. Therefore, the engine system 100 is configured to withstand hundreds of extreme temperature cycles ranging from the inlet propellant temperature (e.g., 30K) to the critical reaction temperature within the fuel bed 128 of each fuel element 122 (e.g., 3000K). As shown in FIG. 3, the radial inflow configuration of the fuel elements allows for the moderator 132 to contact only low temperature (e.g., below 400K) propellant and remain isolated from the high temperature within the axial center 140 of the fuel element 122. As the propellant flows radially inward through the fuel bed 128, the propellant increases to a temperature of up to 3000K at the axial center 140 of the fuel element 122.

The engine system 100 can include an array of reflectors 156 configured to reflect neutrons into and release neutrons from the engine system to increase or decrease the rate of fission within the fuel elements. The reflectors 156 modulate the power output and operating duration of the nuclear rocket engine system 100 by moderating the rate at which neutron-neutron collisions occur within the moderator and set of fuel elements. For example, the reflectors 156 can actuate via an actuator to a closed position to reflect neutrons into the set of fuel elements and increase the incidence of neutron-neutron collisions, thereby increasing the fission rate, the temperature of the fuel elements, and the thrust produced. The reflectors 156 can also actuate to an open position to release neutrons from the moderator to decrease the incidence of neutron-neutron collisions, thereby decreasing the fission rate, the temperature of the fuel elements, and the thrust produced. The reflectors 156 thereby moderate a use rate of the fuel to increase the rocket lifetime.

Additionally, the engine system 100 defines several fluid circuits configured to distribute propellant between components of the engine system. For example, the moderator 132 includes a set of coolant channels thermally isolated from the set of fuel elements. The engine system 100 can direct propellant from the propellant reservoir 178 directly to the moderator coolant channels 134 to maintain the temperature of the moderator 132 below the maximum operating temperature. The thrust nozzle 152 and reflectors 156 also include coolant channels. The thrust nozzle 152 can absorb heat from the propellant exiting the thrust nozzle 152 outlet. The thrust nozzle 152 includes a coolant channel within a wall of the thrust nozzle 152 in order to direct propellant from the propellant reservoir 178 to the nozzle coolant channel 154 to cool the thrust nozzle. Similarly, the reflector coolant channel 170 can receive propellant from the propellant reservoir 178 to cool the reflector, to maintain the reflector 156 under a threshold temperature.

1.3 Engine System Structure

Generally, the engine system 100 is a portion of a rocket that produces thrust to propel the rocket through space. In one implementation, thrust represents an instantaneous measure of force output by the rocket at a given time while impulse defines a total amount of force produced by the rocket over a period of time. Therefore, impulse defines thrust integrated over a period of time. As described within, the engine system 100 can: produce and measure an instantaneous thrust; and produce and measure impulse over time.

Typically, the rocket includes: a payload; a propellant reservoir 178; and an engine system 100. The payload is arranged at a first end of the rocket opposite a second end of the rocket including the engine system 100. The payload can include: a cargo hold configured to store supplies transported by the rocket; and a set of electronics. The propellant reservoir 178 is: arranged upstream of the pump; interposed between the set of fuel elements and a payload; and configured to store a volume of the propellant including hydrogen, the volume of the propellant absorbing neutrons emitted axially by the set of fuel elements during a fission reaction to shield the payload from radiation.

The engine system 100 is arranged at the second end of the rocket and fluidly coupled to the propellant reservoir 178. The engine system 100: receives propellant from the propellant reservoir 178; heats the propellant; and releases the heated propellant to produce thrust to propel the rocket. Generally, the engine system 100 includes: a set of fuel elements 122; a moderator 132; a thrust nozzle; a reflector; a pump; and a fluid circuit (e.g., including pipes and/or valves) through which propellant flows between each of the components.

In one implementation, the reactor assembly defines a particle bed reactor. However, the engine system can alternatively be configured with other nuclear reactor and nuclear fuel types.

1.4 Set of Fuel Elements

Generally, the engine system includes a set of fuel elements. Each fuel element 122 includes a fuel bed 128 containing a set of nuclear fuel particles (e.g., low-enriched uranium kernels or "LEU", high assay low enriched uranium or "HALEU", high enriched uranium or "HEU") configured to release thermal energy via nuclear fission. Each fuel element 122 is configured for propellant to flow through the fuel bed 128 to: cool the nuclear fuel particles; and heat the propellant by absorbing thermal energy from the nuclear fission reactions of the nuclear fuel particles. Each fuel element 122 defines an outlet configured to direct heated propellant from the fuel element 122 to a thrust chamber 176 and/or a thrust nozzle 152 of the engine system 100.

1.4.1 Fuel Element Arrangement

In one implementation, the reactor assembly 120 includes the set of fuel elements 122 arranged within the moderator at a uniform density with a common pitch distance.

In another implementation, the set of fuel elements are arranged in a non-uniform density within the moderator, including: a first cluster of fuel elements arranged in a low-density distribution about the center of the moderator and offset by a first pitch distance between axial centers of these fuel elements; a second cluster of fuel elements arranged in a moderate-density distribution about the first cluster of fuel elements and offset by a second pitch distance—between axial centers of these fuel elements—less than the first pitch distance; and a third cluster of fuel elements arranged in a high-density distribution about the second cluster of fuel elements and offset by a third pitch distance—between axial centers of these fuel elements—less than the second pitch distance. Generally, at any instant in time, a highest density of free neutrons may be present proximal a fuel element located near the center of the moderator—given a nominal fission reaction rate—due to presence of other reactive fuel elements filling a large proportion of the radial field of view of this fuel element. Conversely, at any instant in time, a lowest density of free neutrons may be present proximal a fuel element located near the perimeter of the moderator—given the nominal fission reaction rate—due to the absence of other reactive fuel elements in a large proportion of the radial field of view of this fuel element. Therefore, the system can include a lower density of fuel elements near the center of the moderator and a higher density of fuel elements near the perimeter of the moderator to achieve more uniform availability of neutrons to fuel elements throughout the moderator, thereby achieving more uniform fission rates and propellant output temperatures across these fuel elements.

Figure 5:
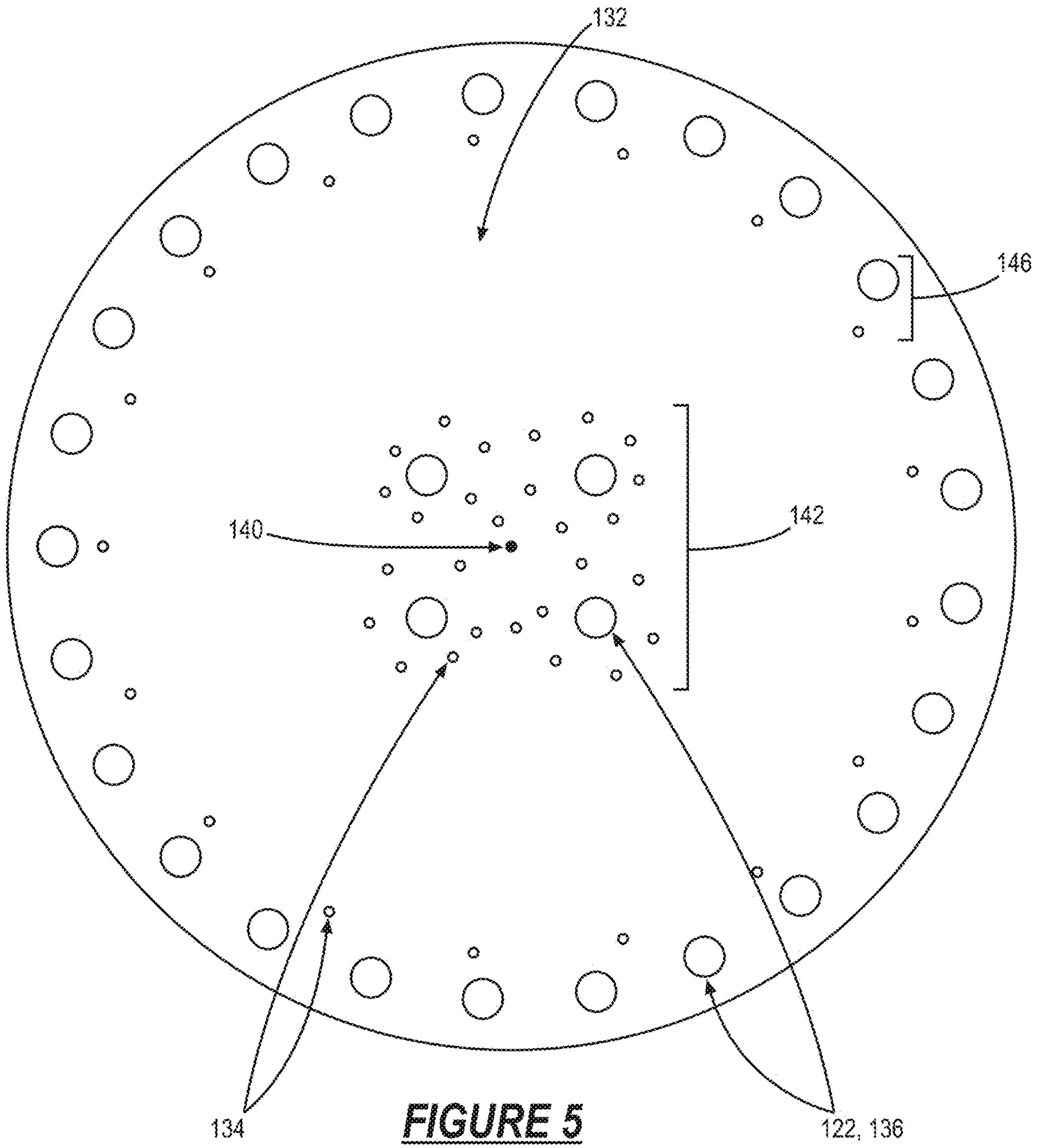
FIG. 5 is a representation of one variation of the nuclear engine system.

In one implementation, the set of fuel elements are arranged in clusters, as shown in FIG. 5, to produce an approximately uniform radial and longitudinal thermal power density within the reactor assembly 120. In one example, the set of fuel elements includes: a first cluster 142 of fuel elements; and a second cluster 146 of fuel elements. In this implementation, the first cluster 142 is arranged in a first region of the moderator distal a reflector 156 that defines an opening of the engine system 100 to the external environment. The first cluster 142 is characterized by a first offset distance between each fuel element 122. The second cluster 146 is arranged in a second region of the moderator proximal a reflector 156 defining an opening to the external environment. The second cluster 146 is characterized by a second offset distance less than the first offset distance between each fuel element 122 of the second cluster 146. The fuel elements of the first cluster 142 exhibit a higher neutron availability than the fuel elements of the second cluster 146. Therefore, the fuel elements of the first cluster 142 define an offset distance higher than the offset distance of the second cluster 146 to balance the thermal power output of the first cluster 142 and the second cluster 146.

1.4.2 Fuel Element Structure

In one implementation, a fuel element 122 of the reactor assembly 120 includes: a cold shell 124; a compliance structure; a fuel bed 128; and a hot shell 126. The cold shell 124: defines a cylindrical geometry including an array of cold perforations and an interior cold surface; is arranged within a moderator bore 136 of a moderator 132; and is configured to direct propellant radially inwardly from the moderator bore 136 through the array of cold perforations, and toward the fuel bed 128.

The fuel bed 128 includes a set of nuclear fuel particles and is configured to release thermal energy via nuclear fission. The set of nuclear fuel particles defines a set of interstitial volumes through which propellant can flow. In one implementation, the fuel bed 128 includes a set of approximately spherical, 1 mm diameter, low-enriched uranium kernels with a 55-70% packing density.

The compliance structure: is interposed between the fuel bed 128 and the cold shell 124; isolates the interior cold surface from direct contact with the fuel bed 128 over a range of operating temperatures of the fuel bed 128; is configured to pass propellant from the cold shell 124 toward the fuel bed 128; and is configured to elastically deform radially and longitudinally to absorb thermal movement of the fuel bed 128 over the range of operating temperatures.

The hot shell 126: defines a cylindrical geometry including an array of hot perforations, an interior chamber, and an outlet port; is coaxial with the cold shell 124; cooperates with the compliance structure to contain the fuel bed 128; and is configured to direct propellant, heated by the fuel bed 128, radially inwardly from the fuel bed 128 into the interior collection volume. The interior collection volume is configured to collect propellant longitudinally out of the fuel element 122 via the outlet port to the thrust chamber 176 and/or thrust nozzle.

1.5 Moderator

The engine system 100 includes a moderator 132 that defines a first set of fuel bores, each fuel bore: fluidly coupled to a warm propellant inflow manifold; occupied by a fuel element; and configured to feed warm propellant axially downward from the warm propellant inflow manifold along a height of the fuel element. The moderator defines a second set of coolant channels: fluidly isolated from the first set of fuel bores; defining moderator coolant inlets fluidly coupled to the thrust-coolant valve; defining moderator coolant outlets fluidly coupled to the pump bypass valve; and configured to pass propellant through the moderator to cool the moderator and cold shells of the fuel elements.

In one implementation, the moderator 132 is characterized by a hydrogenated homogeneous or heterogeneous material. For example, the moderator 132 can include a polymer material (e.g., ultra-high-molecular-weight polyethylene, or “UHMWPE,” “UHMW”) and occupies a solid state below the maximum operating temperature. In another example the moderator can include metal hydrides (e.g., LiH, ZrH, YH) or beryllium-based materials (e.g., Be, and BeO). In this implementation the moderator 132 includes: a set of bores 136 configured to support each fuel element 122 of the set of fuel elements; and the set of moderator coolant channels 134 isolated from the set of bores 136 wherein the set of moderator coolant channels 134 receive propellant to maintain a temperature of the moderator 132 below the maximum operating temperature. Further, each bore 136 of the moderator 132 can define a fluted or splined geometry configured to: support each fuel element 122 within the moderator 132 and define propellant channels through which propellant can flow from the moderator 132 through the perforations of the cold shell 124.

In another implementation, the moderator coolant channels 134 are arranged in clusters including: a first cluster of moderator coolant channels arranged in a high-density distribution about the center of the moderator and offset by a first pitch distance between axial centers of each moderator coolant channel; a second cluster of moderator coolant channels arranged in a moderate-density distribution about the first cluster of moderator coolant channels and offset by a second pitch distance—between axial centers of each moderator coolant channel—greater than the first pitch distance; and a third cluster of moderator coolant channels arranged in a low-density distribution about the second cluster of moderator coolant channels and offset by a third pitch distance—between axial centers of each moderator coolant channel—greater than the second pitch distance. In this way, the moderator coolant channel 134 are arranged based on the thermal exchange rate of the region in which they are located within the engine system 100.

In one implementation, the moderator defines; a first inlet coupled to the set of fuel elements configured to direct warm propellant to the set of fuel elements; and a second inlet coupled to the set of moderator coolant channels configured to direct cool propellant (e.g., from the cold side of the pump) to the set of moderator coolant channels. The first inlet and the second inlet are fluidly isolated such that the first inlet and the set of moderator bores form a first fluid circuit, and the second inlet and the set of moderator coolant channels form a second fluid circuit wherein the first fluid circuit is fluidly sealed from the second fluid circuit to prevent mixing of the two propellant flows through the two fluid circuits.

The moderator defines a moderator coolant outlet configured to outlet the propellant from the moderator coolant channels and direct the propellant out of the moderator. The moderator coolant outlet is fluidly isolated from the set of moderator bores containing the set of fuel elements. Further, each fuel element defines an internal chamber configured to expel heated propellant axially to an end of the fuel element opposite the first inlet of the moderator. Each fuel element expels heated propellant away from the moderator and to the thrust nozzle. The internal chamber of each fuel element and the thrust nozzle are fluidly isolated from the moderator coolant outlet in order to prevent mixing of the flows of propellant.

1.6 Example Set of Fuel Elements Construction

In one implementation, the moderator 132 defines an approximately cylindrical geometry including: the set of bores 136 arranged parallel the longitudinal axis of the moderator 132; and the set of moderator coolant channels 134 arranged parallel to the longitudinal axis of the moderator 132 and offset from the fuel element 122 bores 136. The set of fuel elements extends within the bores 136 of the moderator 132. In this implementation, the reflector 156 or array of reflectors 156 are arranged along a perimeter of the cylindrical geometry of the moderator 132 and each reflector 156 is parallel the longitudinal axis of the moderator 132. Therefore, proximal the perimeter, the fuel elements are arranged with a small pitch offset between the axial center of each fuel element (e.g., e.g., 1.0-3.0 inches) and, distal the perimeter, the fuel elements are sparsely clustered (e.g., exhibit a high offset distance of 4-6 inches) to balance a neutron availability and thermal power output of the fuel elements throughout the reactor assembly.

1.7 Pump

The engine system 100 includes a pump 110 configured to pump propellant throughout the engine system 100. In one implementation, the pump 110 includes a cold side 112 and a hot side 114. The cold side 112 and the hot side 114 each include a separate turbine connected by a single axle. As hot propellant reaches the hot side 114 of the pump, the hot propellant loses thermal energy to the hot side turbine, and that thermal energy rotates the hot side turbine, thereby rotating the axle between the hot and cold side. turbines and operating the cold side 112. Therefore, the pump 110 pumps propellant throughout the engine system 100 at a propellant flow rate that is proportional to the amount of thermal energy provided by the propellant to the hot side 114 of the pump. In this implementation, the pump 110 can also be operated via pressurized fluid exerting force against the turbines. For example, during a startup period of the engine system 100, an orifice of the propellant reservoir 178 is opened to release pressurized propellant to the cold side 112 of the pump, therefore operating the cold side 112 and hot side 114 of the pump 110.

1.8 Reflectors

The engine system 100 includes an array of reflectors 156 arranged about a perimeter of the reactor assembly 120 and configured to reflect neutrons into and out of the reactor assembly 120. The reflector 156 includes: a neutron-reflecting material; and a reflector coolant channel 170 arranged within the reflector 156 and configured to exchange thermal energy with propellant pumped through the reflector 156 coolant channel. The reflector 156 is configured to: at a first time, operate in a closed position to reflect neutrons within the reactor assembly 120 to increase an energy flux of the engine system 100; and, at a second time, operate in an open configured to release neutrons out of the set of fuel elements to decrease the energy flux of the engine system 100.

In one implementation, the reflector 156 defines a thin rectangular prism geometry (e.g., a panel) including a longitudinal axis arranged parallel to the longitudinal axis of the moderator 132 and the reactor assembly 120. The reflector 156 geometry can include a taper that decreases the thickness of the reflector 156 as the reflector 156 extends away from the reactor assembly 120 in the open position.

The reflector 156 couples to a housing of the engine system 100 or directly to the moderator 132 via an actuatable hinge that enables the reflector 156 to rotate about a hinge point defined by the hinge to occupy an open or closed position. In one implementation, the engine system 100 can include a single reflector 156 configured to operate in an open position to allow neutrons to leak out of the set of fuel elements 122 into the external environment to decrease a rate of the fission reaction of the fuel elements. In the cylindrical moderator 132 example, the engine system 100 includes an array of reflectors 156 configured to completely surround the moderator 132 in the closed position. The array of reflectors 156 can overlap to effectively seal neutrons in the reactor assembly 120 in the open position.

The reflector 156 includes a neutron-reflector 156 material such as beryllium. In one implementation, shown in FIG. 4B, the reflector 156 includes a cast solid beryllium panel or fin with a reflector coolant channel 170 drilled through the panel (e.g., extending within the panel). The reflector 156 can also include a beryllium ceramic material that is: 3D printed to define an interior void defining the reflector 156 coolant channel; or sintered to a target density such that the sintered particles define a tortuous coolant channel.

For example, the reflector can include a metallic beryllium structure defining: a pivot axis; a length facing the set of fuel elements in the closed configuration; a width facing the set of fuel elements in the open configuration, the width less than the length; a fluid inlet coaxial with the pivot axis and fluidly coupled to an outlet of the nozzle coolant channel; a fluid outlet coaxial with the pivot axis and fluidly coupled to an inlet of the set of moderator coolant channels; and an interior volume a) fluidly coupled to the fluid inlet and the fluid outlet; b) defining the reflector coolant channel; and c) defining a series of internal vanes 188 intersecting the reflector coolant channel. The reflector can additionally include a reflector actuator 186: coupled to the reflector; and configured to pivot the reflector about the pivot axis between the open configuration and the closed configuration.

In one implementation, the engine system can include a first reflector and a second reflector including an electric motor (e.g., the reflector actuator 186) coupled to the first reflector and to the second reflector via a timing belt and is configured to concurrently: pivot the first reflector about the pivot axis between the open configuration and the closed configuration; and pivot the second reflector about the second pivot axis between the open configuration and the closed configuration.

Figure 4A:
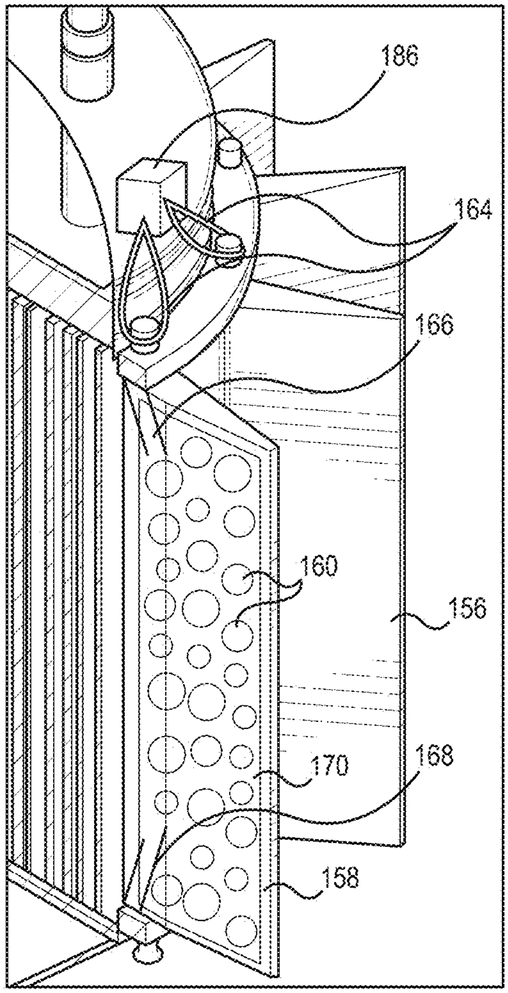
FIGS. 4A and 4B are schematic representations of variation of the nuclear engine system.
Figure 4B:
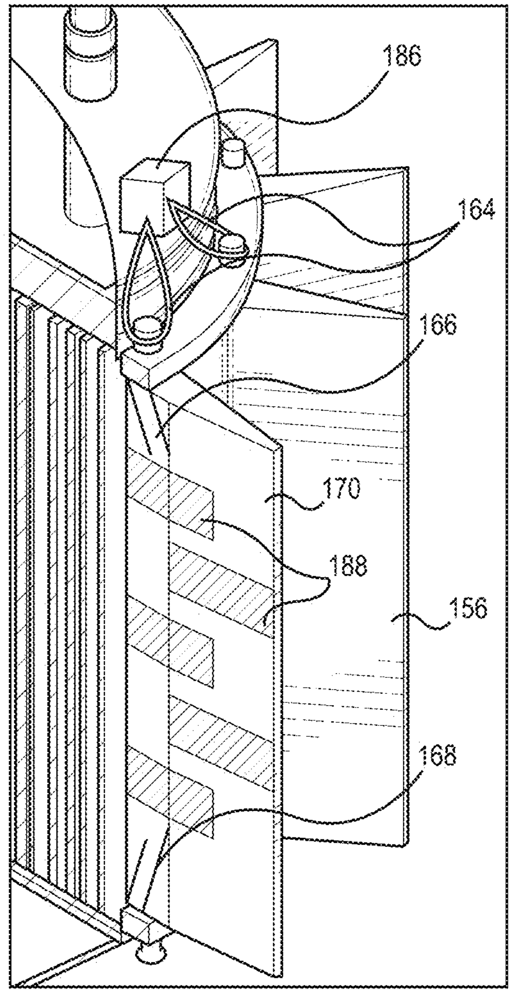

In another implementation, shown in FIG. 4A, the reflector 156 can include: a rigid external shell 158; and a set of beryllium particles 160 contained within the external shell 158. In this implementation, the set of beryllium particles 160 define a set of interstitial volumes that define the reflector 156 coolant channel. Further, the rigid external shell 158 is configured to define a threshold melting temperature (such as during an atmospheric re-entry event) at which the rigid shell 158 can decouple from the engine system 100, thereby opening the set of fuel elements 122 to the external environment to leak neutrons out of the set of fuel elements 122 in order to cool the set of fuel elements 122. In both this implementation and the solid beryllium implementation, the reflector includes a coolant inlet 166 and a coolant outlet 168. The coolant inlets and coolant outlets can define swivel connections to allow a fluid circuit to connect to the inlet and outlet while the reflector occupies different positions about the axle.

For example, the reflector can include a rigid shell defining: a pivot axis; a fluid inlet coaxial with the pivot axis and fluidly coupled to the nozzle coolant channel; a fluid outlet coaxial with the pivot axis and fluidly coupled to the set of moderator coolant channels; and an interior volume: a) fluidly coupled to the fluid inlet and the fluid outlet, b) defining the reflector coolant channel, c) defining a length facing the set of fuel elements in the closed configuration, and d) defining a width facing the set of fuel elements in the open configuration, the width less than the length. In this example, the reflector: includes a matrix of beryllium particles arranged in the interior volume and configured to reflect neutrons; and is configured to pivot about the pivot axis between the open configuration and the closed configuration.

The reflector 156 couples to the engine system 100 via an axle 162 arranged on an edge of the reflector 156 proximal the reactor assembly 120. The reflector 156 actuates via a motor that actuates a drive belt 164 mechanically coupled to the axle 162. The axle 162 can include a set of teeth configured to engage with a set of teeth of the drive belt 164. Therefore, as the motor actuates the drive belt 164, the axle 162 rotates, thereby rotating the reflector.

In one implementation, a motor includes a set of drive belts 164 including a drive belt 164 coupled to each reflector 156 of an array of reflectors 156. For example, the motor can actuate 12 drive belts 164 coupled to 12 reflectors 156. In this implementation, the motor actuates the array of reflectors 156 together.

In another implementation, the engine system 100 includes a set of motors, wherein each motor is configured to actuate an array of reflectors 156. For example, the engine system 100 can include a set of three motors, each motor configured to actuate four drive belts 164 coupled to four reflectors 156. Therefore, the set of twelve reflectors 156 are actuatable as three separate groups.

In another implementation, the engine system 100 includes a set of motors, wherein each motor is configured to actuate a single drive belt 164 coupled to a single reflector. For example, the engine system 100 can include a set of 12 motors, each motor configured to operate a single reflector 156 of the set of 12 reflectors 156.

1.9 Thrust Chamber & Thrust Nozzle

The engine system 100 can further include a thrust chamber 176 and a thrust nozzle 152 configured to: receive heated propellant output by the set of fuel elements; and release the propellant out of the engine system 100 through a nozzle to produce thrust. The thrust nozzle 152 and thrust chamber 176 are arranged downstream of the reactor assembly 120. The thrust chamber 176 receives heated propellant from each fuel element 122. Propellant flows from different fuel elements and can mix in the thrust chamber 176 such as to equalize to a single temperature. The thrust nozzle 152 is configured to release propellant from the reactor assembly 120 to produce thrust.

The thrust nozzle 152 and thrust chamber 176 can increase in temperature due to the thermal energy of the propellant within these components. Therefore, the thrust nozzle 152 includes a nozzle coolant channel 154 arranged within a wall of the thrust nozzle 152 and configured to exchange thermal energy with propellant pumped through the nozzle coolant channel 154. The thrust chamber 176 can include a chamber coolant channel within a wall of the chamber configured to cool the chamber with a flow of propellant.

1.10 Fluid Circuits

The components of the engine system 100 described above are joined via a fluid circuit 190 configured to transport propellant between components. The fluid circuit 190 can include a set of pipes and a set of valves connecting the aforementioned components. For example, the fluid circuit 190 directs propellant: from the propellant reservoir to the cold side 112 of the pump; to the nozzle coolant channel 154 and reflector 156 coolant channel; to the moderator coolant channels 134; to the hot side 114 of the pump; through the reactor assembly 120; and into the thrust chamber 176 to be outlet by the thrust nozzle. The fluid circuit 190 can include a set of valves configured to moderate flows of propellant to each component. The set of valves can additionally open and close bypass pathways within the fluid circuit 190 to direct propellant directly to a component (e.g., by bypassing another component). For example, a valve can open responsive to a high pressure within the fluid circuit 190 to bypass the nozzle coolant channel 154 and direct a flow of propellant to the reflector 156 coolant channel. The set of valves can additionally be electronically actuated by a controller to divide a flow of propellant between two fluid circuit pathways or open/close a pathway of the fluid circuit.

In one implementation, the fluid circuit 190 of the engine system 100 can include: a coolant supply path 192; a thrust path 194; and a coolant return path 196. The coolant supply path 192 includes a fluid circuit: from the propellant reservoir 178; to the cold side 112 of the pump; to the nozzle coolant channel 154; to the reflector 156 coolant channel; and into the set of moderator coolant channels 134. The coolant supply path 192 can include: a first coolant bypass valve configured to a) operate in an open configuration to pass propellant through the nozzle coolant channel 154, and b) operate in a closed configuration to block propellant from entering the nozzle coolant channel 154 and pass the propellant directly into the reflector coolant channel 170 and a second coolant bypass valve configured to a) operate in an open configuration to pass propellant through the reflector 156 coolant channel, and b) operate in a closed configuration to block propellant from entering the reflector coolant channel 170 and pass the propellant directly into the set of moderator coolant channels 134.

The thrust path 194 can include the fluid circuit: extending from the moderator coolant channels 134; to the hot side 114 of the pump; through the set of fuel elements; and out of the thrust nozzle. In one implementation, the thrust path can include a coolant return path 196 between an outlet 180 of the moderator coolant channels 134 and the hot side 114 of the pump. The thrust path 194 can additionally include: a pump bypass valve 172 configured to a) operate in an open position to pass propellant from the outlet of the set moderator coolant channels 134 to the hot side 114 of the pump, and b) operate in a closed position to block the hot side 114 of the pump 110 thereby passing the propellant from the outlet of the set of moderator coolant channels 134 to the set of fuel elements 122.

1.11 Sensors

The engine system 100 can additionally include a set of sensors configured to output signals indicating conditions of the engine system 100. The set of sensors can include accelerometers, temperature sensors, mechanical load sensors, pressure sensors, neutron sensors, flow sensors, and position sensors. For example, engine system 100 can include a temperature sensor arranged within each fuel element 122 and configured to output a signal representing a temperature within each fuel element 122. The pressure sensors can arrange throughout the fluid circuit to output signals corresponding to a pressure within the fluid circuit to the controller. The position sensors can detect a position of a valve and/or a reflector 156 of the engine system 100. The set of sensors can include both electronic and mechanical sensors.

1.12 Controller

The engine system 100 includes a controller configured to: access target parameters (e.g., target temperatures, target thrusts, target neutron populations); receive signals from sensors; actuate a reflector via a reflector actuator 186; and actuate valves within the engine system 100.

In one implementation, the controller is arranged within the payload to reduce radiation damage to the electronics within the controller. In another arrangement, the controller is located within or proximal the engine system 100 and includes a shield.

The controller is configured to: access target parameters of the system (e.g., temperatures, pressures, angles, neutron populations, and thrusts); and implement closed-loop controls to shift the current parameters of the system toward the target parameters. For example, the controller can: access a target fuel element 122 temperature associated with a current target thrust of the engine system 100; and read an output signal from a temperature sensor near the fuel elements. In response to the output signal from the temperature sensor of the fuel element 122 indicating a temperature higher than the target fuel element temperature, the controller actuates a pump bypass valve 172 to direct additional flow of propellant from the moderator 132 coolant outlet to the hot side 114 of the pump 110 to increase a propellant flow rate of propellant through the fuel elements, thereby lowering the temperature of the fuel elements. The controller can replicate these steps to access other target parameters and adjust temperatures, pressures, and fission rates, throughout the engine system 100.

1.12.1 Reflector Position

In one implementation, the reflectors 156 are coupled to a housing of the engine system via reflector axles 162 and actuated by a reflector actuator 186. The engine system can include a set of reflector position sensors (e.g., a splined encoder, a magnetic encoder, a depth sensor) configured to output a signal to the controller corresponding to a current position and/or angle of each reflector. The controller can therefore access the reflector position sensor signal to detect the position of the reflectors and calculate an angle to trigger the reflector actuator 186 to which it can actuate the reflectors 156.

In one example wherein the moderator defines a cylindrical geometry, the set of fuel elements define a circular array within the moderator, and the reflector couples to a hinge point of a housing of the moderator proximal the perimeter of the cylindrical geometry. In response to a first target thrust, the reflector occupies (e.g., the controller triggers the reflector actuator to actuate the reflector to) a first shallow angle relative to a tangent of the perimeter of the set of fuel elements such that a widest cross-section of the neutron-reflective material of the reflector faces the reactor assembly 120 and reflects a greater number of neutrons back into the set of fuel elements 122 to increase the rate of fission within the set fuel elements to a first target rate of fission proportional to the first target thrust. In response to a second target thrust less than the first target thrust, the reflector occupies a second wide angle, greater than the first shallow angle, relative to the tangent of the perimeter of the reactor assembly such that a narrowest cross-section of the neutron-reflective material of the reflector faces the set of fuel elements, releases more neutrons to an external environment to reduce the rate of fission within the reactor assembly to a second target rate of fission proportional to the second target thrust. In one implementation, the controller: calculates a target angle of the reflectors 156 based on a current thrust output of the system, a target thrust output of the system, a current temperature of the fuel elements, and/or a target a temperature of the fuel elements.

In one implementation, the controller detects an instantaneous thrust from outputs of accelerometers and mechanical load sensors. The controller can then: calculate an integrated total impulse and detect, based on the integrated total impulse if a target impulse condition is met (e.g., a target impulse has been produced by the engine system).

In response to the current thrust greater than the target thrust, the controller: triggers the reflector actuator to open the reflectors 156 by angular distance proportional to the difference between the current thrust and the target thrust, thereby releasing neutrons from the system, reducing a rate of fission within the fuel elements, reducing temperatures within the fuel elements, and reducing the current thrust output from the system.

In response to the current thrust less than the target thrust, the controller: triggers the reflector actuator to close the reflectors 156 by angular distance proportional to difference between the current thrust and the target thrust, thereby increasing the availability of neutrons within the system, increasing a rate of fission within the fuel elements, increasing temperatures within the fuel elements, and increasing the current thrust output from the system.

1.12.2 Thrust-coolant Valve Position

The engine system includes a thrust-coolant valve 174 configured to actuate direct propellant flow from the cold side of the pump to the moderator coolant channels or to the nozzle coolant channel. The thrust-coolant valve can regulate both the rate of propellant flow from the cold side of the pump and the proportion of propellant flow directed to the moderator coolant channel and nozzle coolant channel. The thrust-coolant valve is configured to actuate to a set of positions to divide a flow of propellant from the cold side of the pump between the moderator coolant channel and the nozzle coolant channel.

For example, the controller triggers the thrust-coolant valve 174 to actuate to a first position in which the thrust-coolant valve directs 100% of the propellant from the cold side of the pump to the moderator coolant channel to cool the moderator. The controller can trigger the thrust-coolant valve to actuate to a second position in which the thrust-coolant valve directs 100% of the propellant from the cold side of the pump to the nozzle coolant channels to cool the nozzle and reflectors.

The thrust-coolant valve is additionally configured to actuate between the first and second positions. For example, in response to the controller detecting a temperature of the moderator over the moderator operating temperature range, the controller triggers the thrust-coolant valve to actuate to increase a proportion of flow from the propellant to the moderator coolant channel and decrease the proportion of propellant flowing to the nozzle coolant channels. In this example, if the thrust-coolant valve initially occupied a position dividing the propellant such that 50% of the propellant flowed to the moderator coolant channel and 50% of the propellant flowed to the nozzle coolant channel, the controller can actuate the thrust-coolant valve to divide the propellant to direct 75% of the flow to the moderator coolant channel and 25% of the flow to the nozzle coolant channel.

In response to the controller detecting a temperature of the nozzle over the nozzle operating temperature range, the controller can trigger the thrust-coolant valve to actuate to increase the amount of propellant flowing to the nozzle coolant channel and decrease the amount to the moderator coolant channel.

Increasing the flow of propellant to the nozzle coolant channels decreases the temperature of the propellant that enters the moderator coolant channels, thereby decreasing the temperature of propellant that exits the moderator coolant outlet 180 and flows to the fuel elements.

1.12.3 Pump Bypass Valve Position

The engine system includes a pump bypass valve 172 configured to actuate to direct propellant from the moderator coolant outlet 180 to the hot side of the pump or to the set of fuel elements. Pump bypass valve 172 is configured to actuate to a set of positions to divide the flow of propellant from the moderator coolant outlet between the hot side of the pump and the set of fuel elements.

For example, the controller triggers the pump bypass valve to actuate to a first position in which the pump bypass valve directs 100% of the propellant to the hot side of the pump. In this example, the propellant loses thermal energy to the hot side of the pump, causing the pump to increase a rotation rate at the cold and hot sides. Therefore, the flow rate within the engine system increases. Therefore, in response to the controller detecting a current thrust below a target thrust, the controller can actuate the pump bypass valve to increase a proportion of propellant directed to the hot side of the pump to increase the flow rate through the set of fuel elements thereby increasing the thrust. The controller is additionally configured to actuate the pump bypass valve to decrease the proportion of propellant flowing to the hot side of the pump and increase the proportion of the propellant flowing directly to the set of fuel elements to increase a temperature of the fuel elements.

In another example, increasing the flow of propellant to the hot side of the pump increases the flow rate throughout the engine system.

The controller can trigger the pump bypass valve to actuate to balance a mass flow rate and a temperature of the engine system. For example, the controller can trigger the pump bypass valve to actuate to a position in which 25% of the flow from the moderator coolant outlet is directed to the hot side of the pump to maintain a rate of flow through the system and 75% of the flow of propellant is directed to the set of fuel elements to cool the fuel elements and produce thrust.

1.12.4 Circulation Valve

Figure 2A:
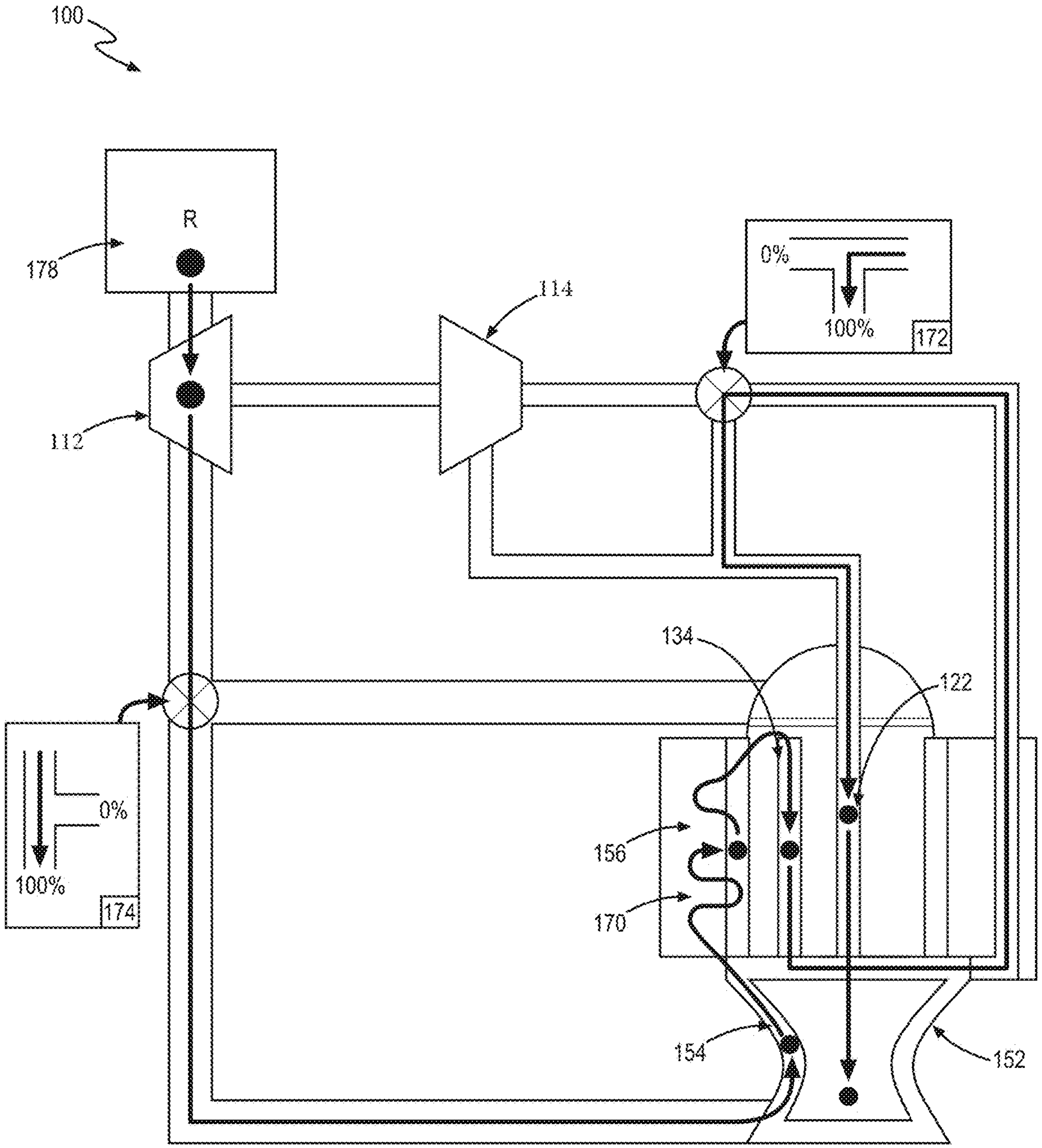
FIGS. 2A, 2B, 2C, 2D, 2E, and 2F are a schematic representations of one variation of a method.
Figure 2B:
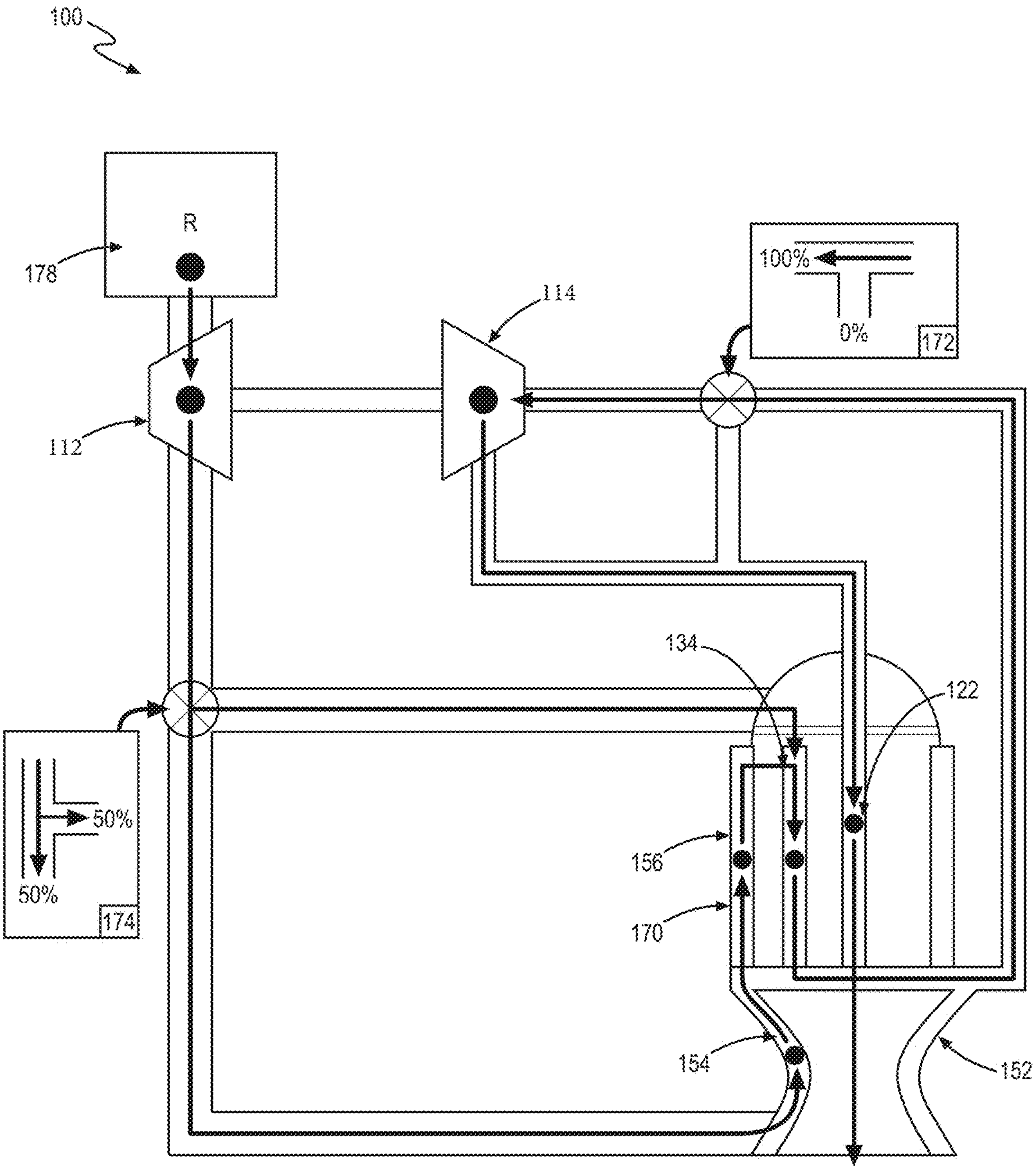
Figure 2C:
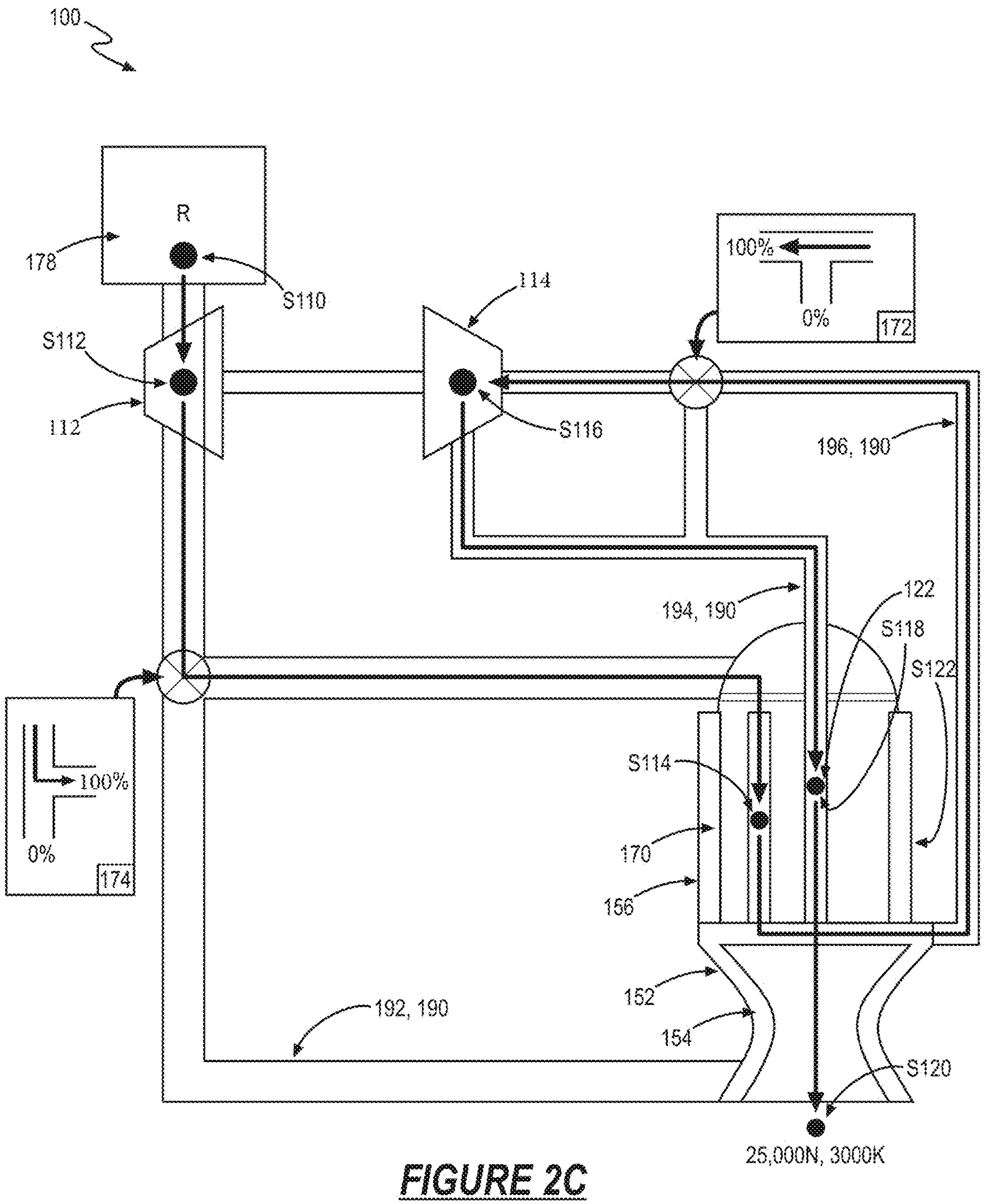
Figure 2D:
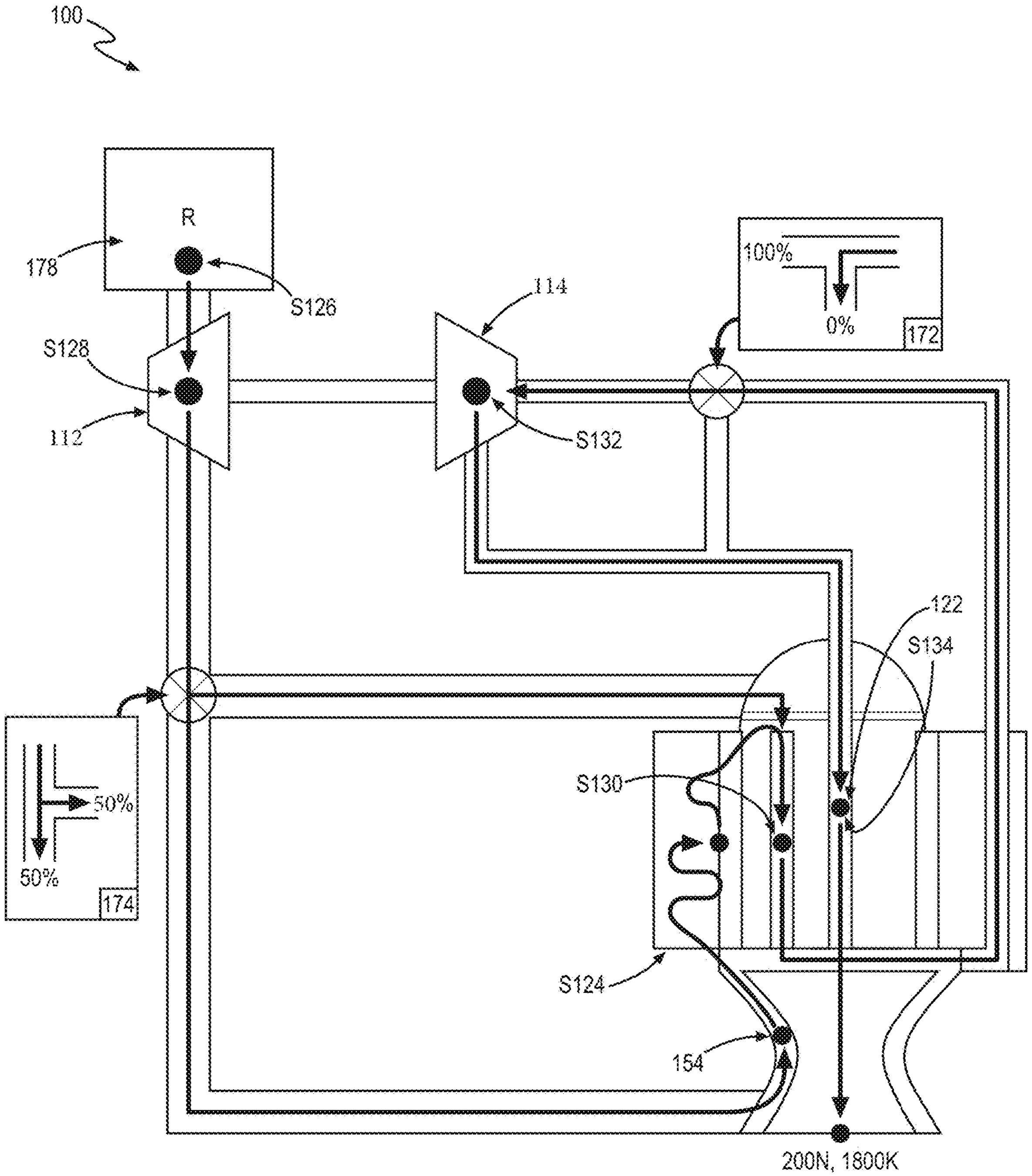
Figure 2E:
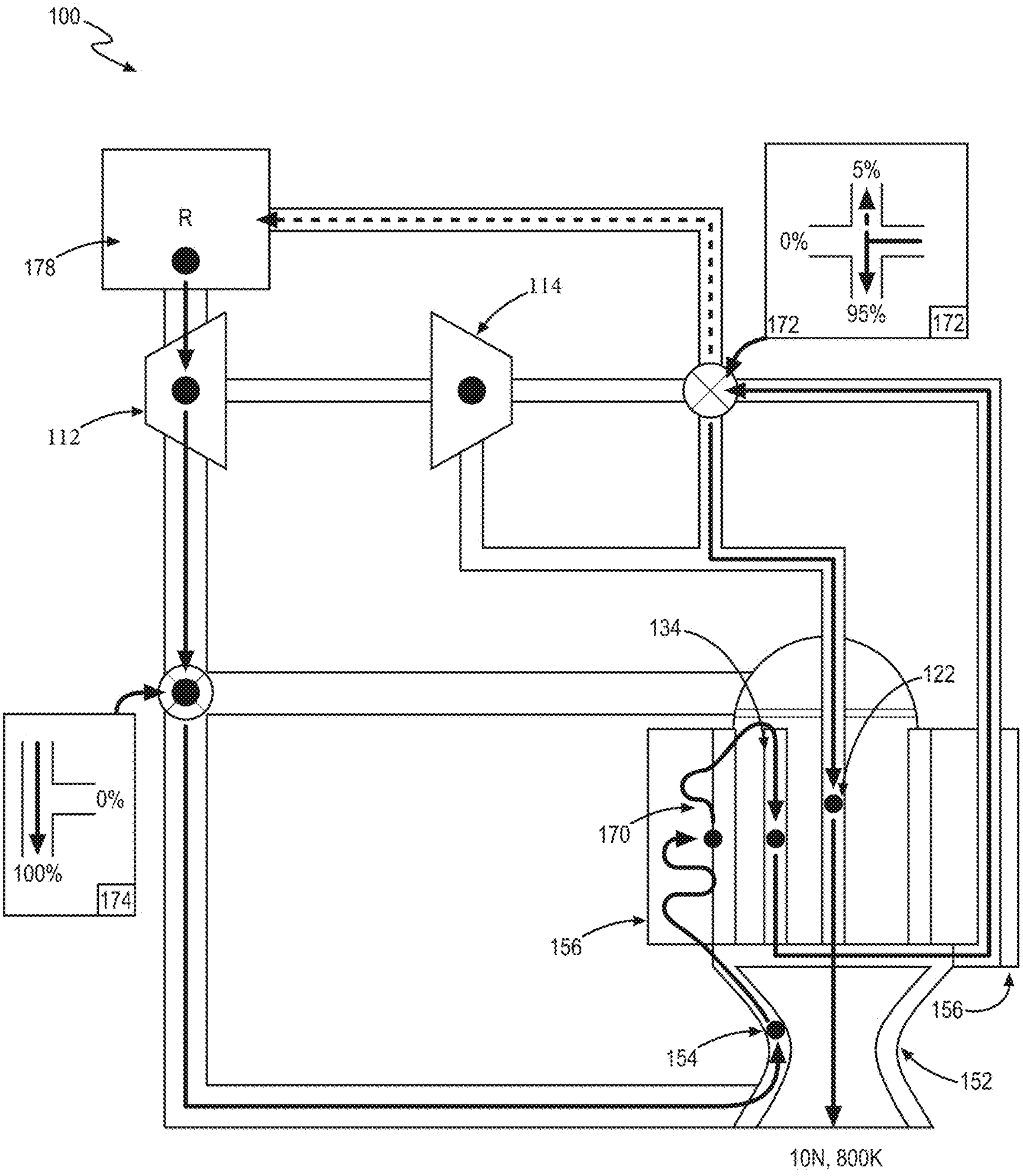
Figure 2F:
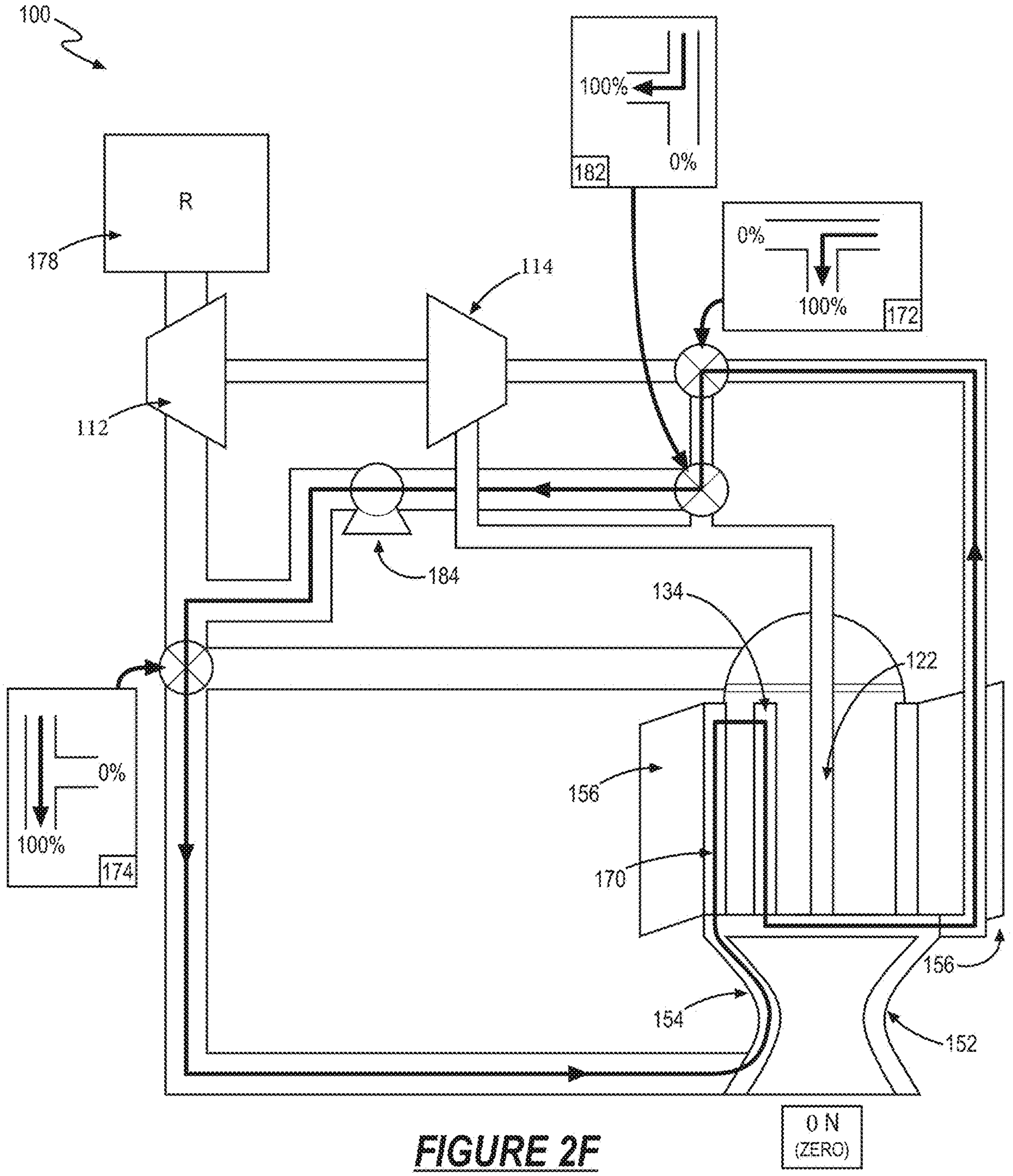

The engine system can include a circulation valve 182 configured to direct propellant to circulate through a circulation loop (FIG. 2F). During a circulation state of the engine the controller actuates the circulation valve 182 to a circulation position in which 100% of the propellant is directed into the circulation loop. In the circulation state, the propellant flows from the moderator coolant outlet 180 to the pump bypass valve that is actuated to direct 100% of the propellant to the set of fuel elements (e.g., in a full pump bypass position). The propellant travels through the circulation valve in the circulation position and into the circulation loop. The circulation loop directs the propellant to the nozzle coolant channel, to the reflector coolant channel, and back into the moderator coolant channel. The coolant loop can include an active pump (e.g., a hydraulic or electric pump) configured to pump cool propellant throughout the coolant loop during the circulation state.

1.12.5 Thrust Profile

In one implementation, the controller is configured to calculate a thrust profile for the nuclear rocket engine to produce a total; impulse. The thrust profile can include: the first time period defining a hot-thrust state characterized by locating the reflector at the closed position to increase the fission rate within the set of fuel elements and increase a total impulse output of the nuclear rocket engine to the first thrust; and the second time period defining cooldown state characterized by locating the reflector at the open position to decrease the fission rate within the set of fuel element, cool the set of fuel elements to a nominal temperature, and estimate the decreasing thrust output of the nuclear rocket engine to the second thrust less than the first thrust. In this implementation, the first time period defining the hot-thrust state period includes generating a first proportion of the target total impulse, and the second time period defining the cooldown-thrust state period includes generating a second proportion of the target total impulse, a sum of the first proportion and the second proportion approximating the target total impulse.

For example, during controller can calculate that 90% of a target total impulse is produced in the first stage while the remaining 10% is produced with the reflectors 156 open during the second stage. Therefore, the controller can receive a target thrust or impulse signal and actuate reflector 156 positions to achieve a total impulse approximating the target thrust or total impulse.

2 Method

As shown in FIGS. 2A and 2B, a method S100 for controlling a nuclear rocket engine system 100 includes, during first time period at the nuclear rocket engine by a pump, pumping a propellant: from a propellant reservoir 178 at a supply temperature in Block S110; through a cold side 112 of the pump 110 in Block S112; to a set of moderator coolant channels 134, extending axially within a moderator 132, to cool the moderator 132 in Block S114; to a hot side 114 of the pump 110 to operate the cold side 112 of the pump 110 in Block S116; through a set of fuel elements to heat the propellant to a first outlet temperature, the set of fuel elements extending axially within the moderator 132 and isolated from the set of moderator coolant channels 134 in Block S118; and out of a thrust nozzle 152 to produce a first thrust in Block S120. The method S100 additionally includes, during the first time period locating the reflector, arranged about the set of fuel elements and the moderator 132, at a first closed position to reflect neutrons toward the reactor assembly 120 to maintain a fission rate of the set of fuel elements above a threshold fission rate in Block S122.

Additionally, during a second time period, the method S100 includes locating the reflector 156 at a second open position to release additional neutrons from the nuclear rocket engine and to reduce the fission rate of the set of fuel elements to below the threshold fission rate in Block S124. Further, during the second time period the pump, pumps the propellant: from the propellant reservoir 178 at the supply temperature in Block 126; through the cold side 112 of the pump 110 in Block S128; to the set of moderator coolant channels 134 to cool the moderator 132 in Block S130; to the hot side 114 of pump 110 to operate the first side of the pump 110 in Block S132; through the set of fuel elements to cool the set of fuel elements and to heat the propellant to a second outlet temperature less than the first outlet temperature in Block S134; and out of the thrust nozzle 152 to produce a second thrust less than the first thrust in Block S136.

In one variation of the method S100, during the first time, the pump 110 pumps propellant: from a propellant reservoir 178 at a supply temperature; through a cold side 112 of the pump; to a set of moderator coolant channels 134, extending axially within a moderator 132, to cool the moderator 132; to a hot side 114 of the pump 110 to operate the cold side 112 of the pump; through a cold shell 124 perforation of a fuel element 122 in a radial direction; through a fuel bed 128 of the fuel element 122 comprising a set of nuclear fuel particles defining a set of interstitial volumes through which the propellant flows to heat the propellant to a first outlet temperature; through a hot shell 126 perforation of the fuel element 122 in the radial direction; out of the fuel element 122 in an axial direction parallel to a longitudinal axis of the first fuel element 122; and out of a thrust nozzle 152 to produce a first thrust.

In this variation of the method S100, during the second period the pump 110 pumps propellant: from the propellant reservoir 178 at the supply temperature; through the cold side 112 of the pump; to the set of moderator coolant channels 134 to cool the moderator 132; to the hot side 114 of pump 110 to operate the first side of the pump; through the cold shell 124 perforation of the fuel element 122 in the radial direction; through the fuel bed 128 of the fuel element 122 to heat the propellant to a second outlet temperature less than the first outlet temperature; through the hot shell 126 perforation of the fuel element 122 in the radial direction; out of the fuel element 122; and out of the thrust nozzle 152 to produce a second thrust less than the first thrust.

In another variation of the method S100, the method includes, during a first time period at a nuclear rocket engine locating the reflector, arranged about a set of fuel elements at a first angle to: reflect a first proportion of neutrons toward the set of fuel elements to maintain a first fission rate of the set of fuel elements above a threshold fission rate; and reflect a second proportion, less than the first proportion, of neutrons out of the nuclear rocket engine. Additionally at the first time period, the pump 110 pumps propellant: to a set of moderator coolant channels 134, extending axially within a moderator 132, to cool the moderator 132; through the set of fuel elements to heat the propellant to a first outlet temperature proportional to the first fission rate, the set of fuel elements extending axially within the moderator 132 and isolated from the set of moderator coolant channels 134; and out of a thrust nozzle 152 to produce a first thrust.

In this variation of the method S100, the method S100 includes during a second time period locating the reflector 156 at a second angle to: reflect a third proportion of neutrons toward the set of fuel elements to reduce a second fission rate of the set of fuel elements to below the threshold fission rate; and reflect a fourth proportion, greater than the third proportion, of neutrons out of the nuclear rocket engine. Additionally, the pump 110 pumps propellant: to the set of moderator coolant channels 134 to cool the moderator 132; through the set of fuel elements to cool the set of fuel elements and to heat the propellant to a second outlet temperature less than the first outlet temperature and proportional to the second fission rate; and out of the thrust nozzle 152 to produce a second thrust less than the first thrust.

2.1 Applications

Generally, the method S100, includes: a hot thrust-producing state; and a cooldown state. During the hot thrust-producing state: the reflectors 156 are actuated to a closed position to reflect neutrons toward the set of fuel elements; and the pump 110 pumps propellant through the moderator coolant channels 134 to cool the moderator 132, through a set of fuel elements to heat the propellant to a first outlet temperature, and out of a thrust nozzle 152 to produce a first thrust. During the cooldown state: the reflectors 156 are actuated to an open position to allow neutrons to exit the set of engine system 100 to the external environment; and the pump 110 pumps propellant through the moderator coolant channel 134 to cool the moderator 132, through the set of fuel elements to heat the propellant to a second outlet temperature less than the first outlet temperature, and out of the thrust nozzle 152 to produce a second thrust less than the first thrust. The method S100 can transition the engine system 100 to additional states including: a virgin startup state; a bleed-off state; and a re-start state.

The method S100 enables the nuclear rocket engine system 100 to transition states to modulate: the fission rate within the set of fuel elements; and the amount of thrust produced. Within these engine system 100 states, the engine system 100 divides flow of propellant throughout the engine system 100 to direct high flows to components that are over an operating temperature range. In this way, the method preserves the longevity of the nuclear rocket engine system 100 by maintaining a target operating temperature within the engine system 100.

2.2 Engine Cycle

Generally, the engine cycle of the engine system 100 includes pumping propellant through fluid circuits of the engine system 100 and altering the positions of reflectors 156 to: produce thrust; and maintain the components of the engine system 100 within an operating temperature range. In one implementation, the engine system 100 produces thrust and maintains the operating temperature by actuating: a thrust-coolant valve 174; a pump bypass valve 172; and the array of reflectors 156.

To produce thrust the pump 110 pumps propellant: through the set of fuel elements arranged within the moderator 132; and out of the thrust nozzle. Pumping propellant though the set of fuel elements further includes pumping, by the pump, the propellant: through a cold shell 124 perforation of a first fuel element 122 of the set of fuel elements in a radial direction; through a fuel bed 128 of the first fuel element 122 comprising a set of low-enriched uranium nuclear fuel particles defining a set of interstitial volumes through which the propellant flows; through a hot shell 126 perforation of the first fuel element 122 in the radial direction; and out of the first fuel element 122 in an axial direction parallel to a longitudinal axis of the first fuel element 122. The engine system 100 produced thrust by heating a volume of propellant by directing the propellant through the fuel bed 128 of a fuel element 122 to absorb thermal energy from the fission reaction of the nuclear fuel particles. In one implementation, the engine system 100 can increase thrust by directing propellant from the outlet 180 of the moderator coolant channels 134 to the hot side 114 of the pump 110 to rotate the pump 110 faster, thereby increasing a propellant flow rate of propellant pumped through the fuel elements.

To maintain the components of the engine system 100 within the operating temperature range, the pump 110 pumps cool propellant (e.g., at the supply temperature, as low as 14K) through the components of the engine system 100. For example, to cool the moderator 132 to a temperature below the maximum operating temperature of the moderator 132, the pump 110 pumps propellant: from the propellant reservoir 178; through the cold side 112 of the pump; and to the moderator coolant channels 134. The pump 110 additionally pumps propellant: from the propellant reservoir 178; to the nozzle coolant channel 154 to cool the thrust nozzle; and to the reflector coolant channel 170 to cool the reflector. Additionally, the fuel bed 128 of each fuel element 122 is cooled by the pump 110 pumping propellant through the fuel element 122, thereby preventing meltdown of the nuclear fuel particles.

The controller of engine system 100 can actuate a set of valves to moderate a proportion of flow of propellant pumped to each component. For example, the engine system 100 can include a thrust-coolant valve 174 arranged between the cold side 112 of the pump 110 and the coolant supply path and propellant supply path configured to: actuate to a target position to pass a first target proportion of propellant into the coolant supply path and to pass a second target proportion of propellant into the propellant supply path, wherein the first target proportion of propellant is larger than the second target proportion of propellant to increase a mass propellant flow rate of propellant, and the first target proportion of propellant is smaller than the second target proportion of propellant to decrease the mass propellant flow rate of propellant.

The controller can therefore dynamically adjust: a first proportion of propellant from the cold side 112 of the pump 110 to the coolant pathway (e.g. through the nozzle coolant channel 154 and reflector 156 coolant channel); and a second proportion of propellant from the cold side 112 of the pump 110 to the thrust pathway (e.g., to the moderator coolant channels 134 and into the set of fuel element 122).

In one implementation, to decrease a temperature of the nozzle and reflector, the controller actuates the thrust-coolant valve 174 to a position such that a first proportion of propellant directed to the coolant pathway is higher than the second proportion to the thrust pathway.

2.3 Engine State: Conditioning

Figure 6A:
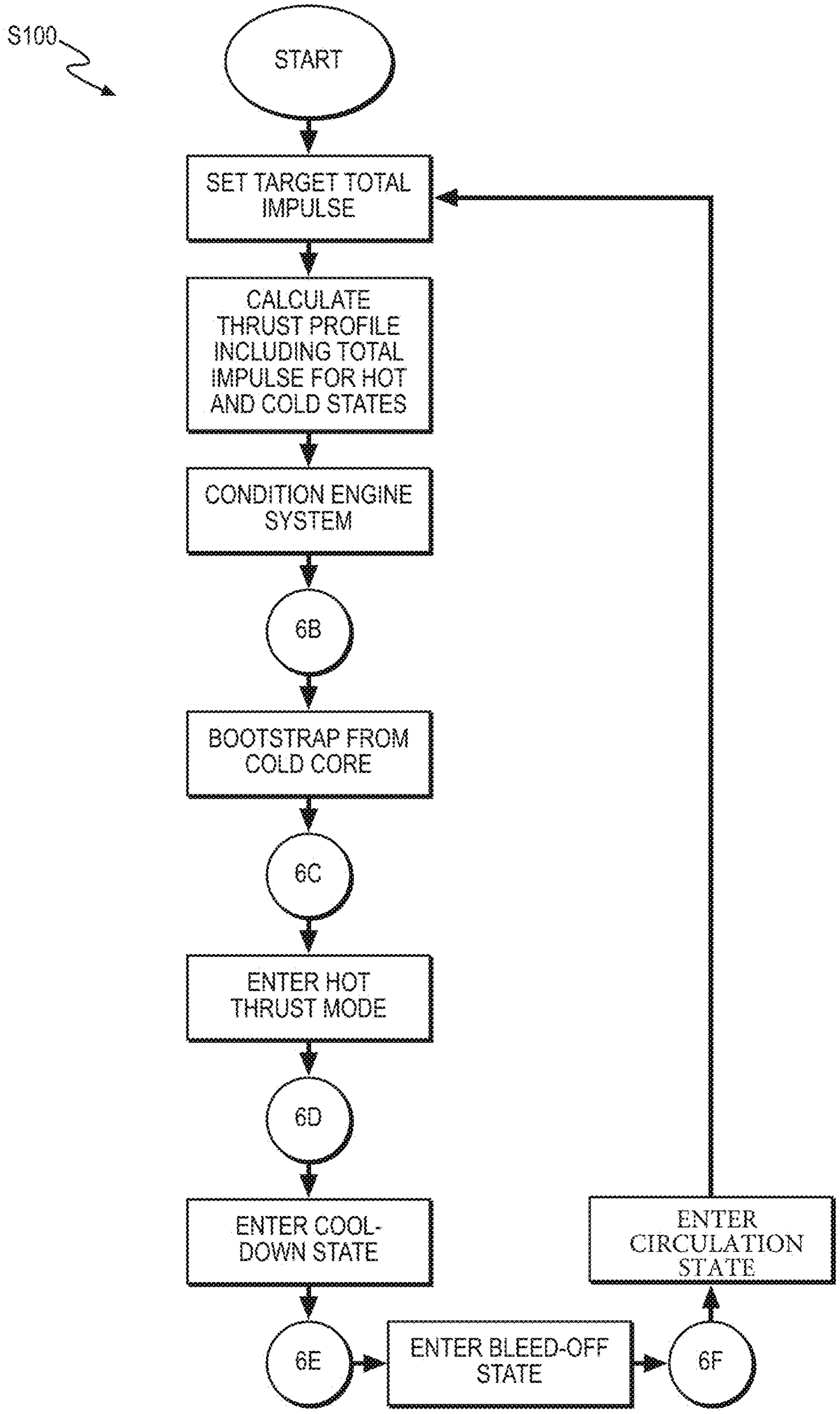
FIGS. 6A, 6B, 6C, 6D, 6E, and 6F are flowcharts representing one variation of the method.
Figure 6B:
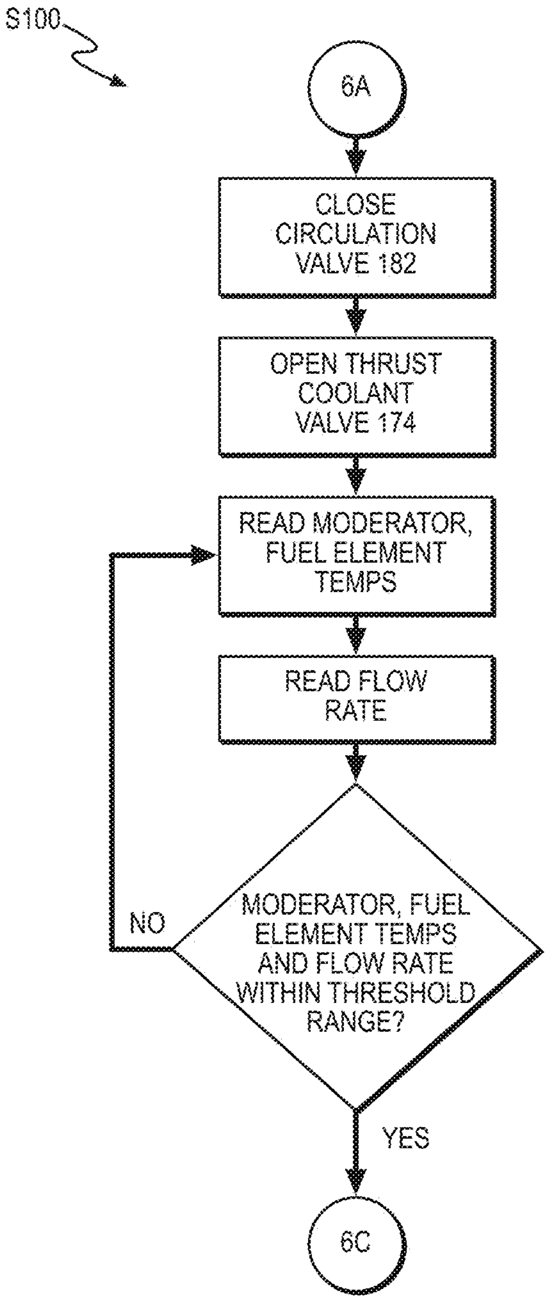

In one implementation, before the engine system 100 can produce thrust, the engine system conditions (e.g., heats, circulates) the propellant within the fluid circuits to a target conditioning temperature range, shown in FIGS. 2A and 6B. In the conditioning state, the pump bypass valve 172 and circulation valve 182 occupies a closed position configured to direct propellant to the fuel elements 122 (e.g., bypassing the hot side 114 of the pump 110). The thrust-coolant valve occupies an open position to direct propellant to the nozzle coolant channel and reflector coolant channel. The engine system directs propellant: from the propellant reservoir; to the cold side 112 of the pump; through the thrust-coolant valve 174; through the nozzle coolant channel and reflector coolant channel (of the open reflectors 156); through the moderator coolant channel; and though the set of fuel elements. In this state, the propellant circulates slowly through the fluid circuit to transfer thermal energy between components to reach an equilibrium state (e.g., wherein the components each occupy a target conditioning temperature range). In one implementation, the equilibrium state can include each component occupying approximately equal temperatures. Due to the low temperature and flow rate of the propellant expelled by the thrust nozzle during the conditioning state, minimal thrust (e.g., $<$100N) is produced.

The controller can read sensors throughout the engine system to detect if the equilibrium conditions are met. For example, the controller can read the moderator and fuel element temperatures from temperature sensors and read the flow rate throughout the fluid circuit from a flow sensor. Based on the outputs of these sensors, the controller detects the equilibrium condition and triggers the reflector actuators to begin incrementally closing the reflectors to enter the bootstrapping state (shown in FIG. 6C). If the outputs of the sensors do not indicate the equilibrium condition the controller can wait (e.g., set a timer and upon expiration of the timer) read the sensor outputs at a later time.

2.4 Engine State: Bootstrapping

Figure 6C:
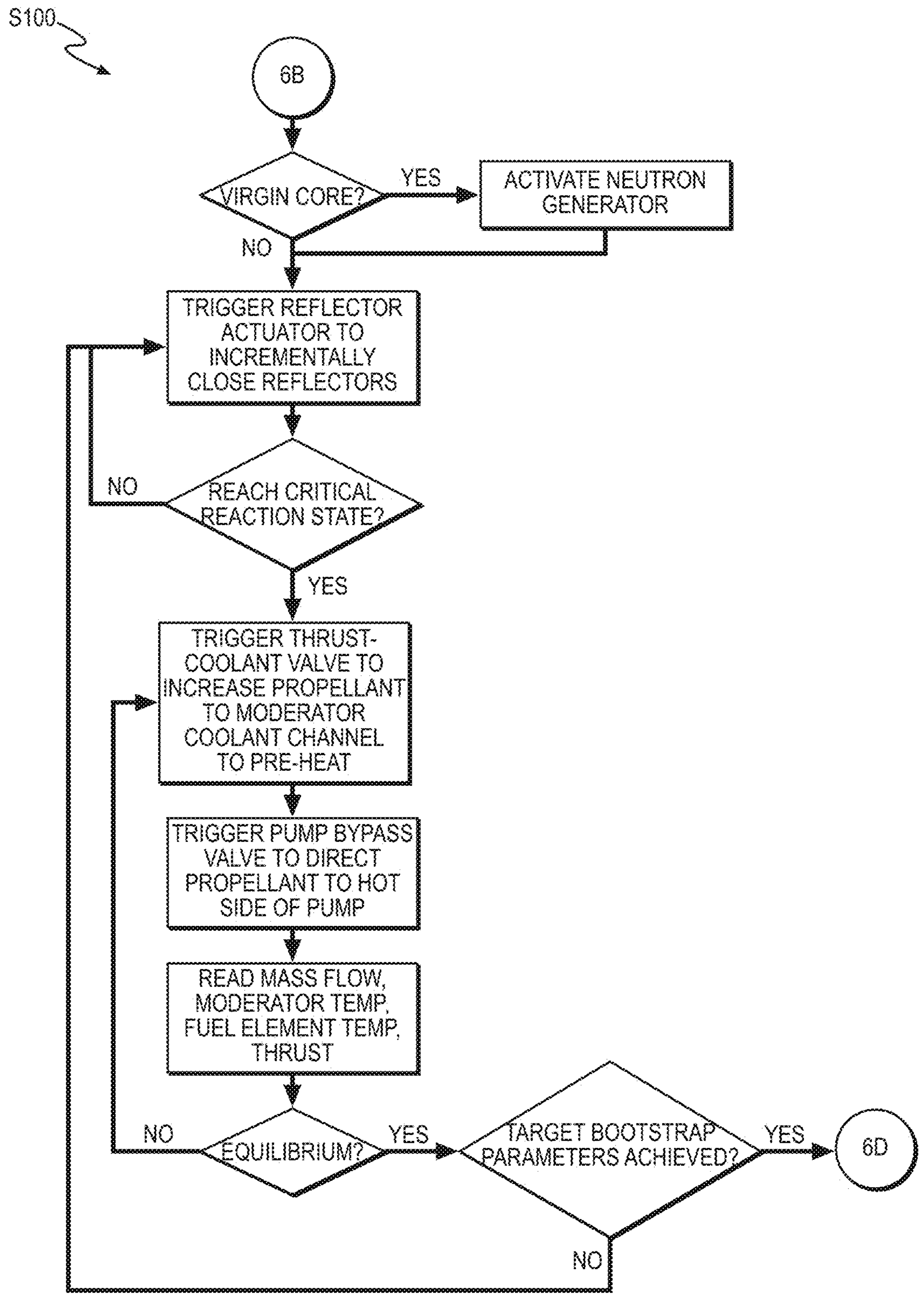

During the bootstrapping state, shown in FIGS. 2B and 6C the controller triggers the reflector actuators to actuate the reflectors to close incrementally.

If the reactor assembly includes a virgin core (e.g., wherein the nuclear fuel particles are not exhibiting active fission), the controller can trigger a neutron generator to direct a stream of neutrons into the reactor assembly 120 to collide with the nuclear fuel particles within a fuel element 122 and begin the fission reaction, thereby increasing the temperature within the fuel elements 122 and reactor assembly 120. During virgin startup state, there are no residual decay products, and neutron flux is effectively zero within the reactor assembly 120.

During the bootstrapping state, the controller triggers the thrust-coolant valve 174 to actuate to a position in which the thrust-coolant valve 174 directs: approximately 50% of propellant from the cold side 112 of the pump 110 to the moderator coolant channel; and approximately 50% of propellant from the cold side 112 of the pump 110 to the nozzle coolant channel and reflector coolant channel. The controller triggers the pump bypass valve 172 to actuate to direct 100% of the propellant from the outlet of the moderator coolant channels to the hot side 114 of the pump 110 to operate the pump.

In one implementation, the controller can calculate a target reflector 156 angle based on an incremental (less than full) target thrust and a current fuel element 122 temperature. The controller actuates the reflector 156 to a closed position to increase the fission rate within the set of fuel elements and begin to produce thrust. The controller monitors neutron flux (e.g., by reading the output of a neutron sensor or dosimeter) and fuel element temperatures (e.g., by reading the output of a temperature sensor near the fuel element) to detect a critical reaction state. In response to reaching the critical reaction state (e.g., defining a stable fission reaction and/or a temperature within the fuel element high enough to produce a target thrust), the controller can: trigger the thrust-coolant valve to increase a proportion of propellant flowing to the moderator coolant channel; and read a mass flow, moderator temperature, fuel element temperature, and instantaneous thrust produced to detect a bootstrap equilibrium state. During the bootstrapping state, the engine system produced an instantaneous thrust higher than the during the conditioning state, but below the hot thrust state output. Once a set of target bootstrap parameters are met (e.g., a threshold fuel element temperature, threshold flow rate etc.) the engine system can enter the hot thrust state.

2.5 Engine State: Hot Thrust

Figure 6D:
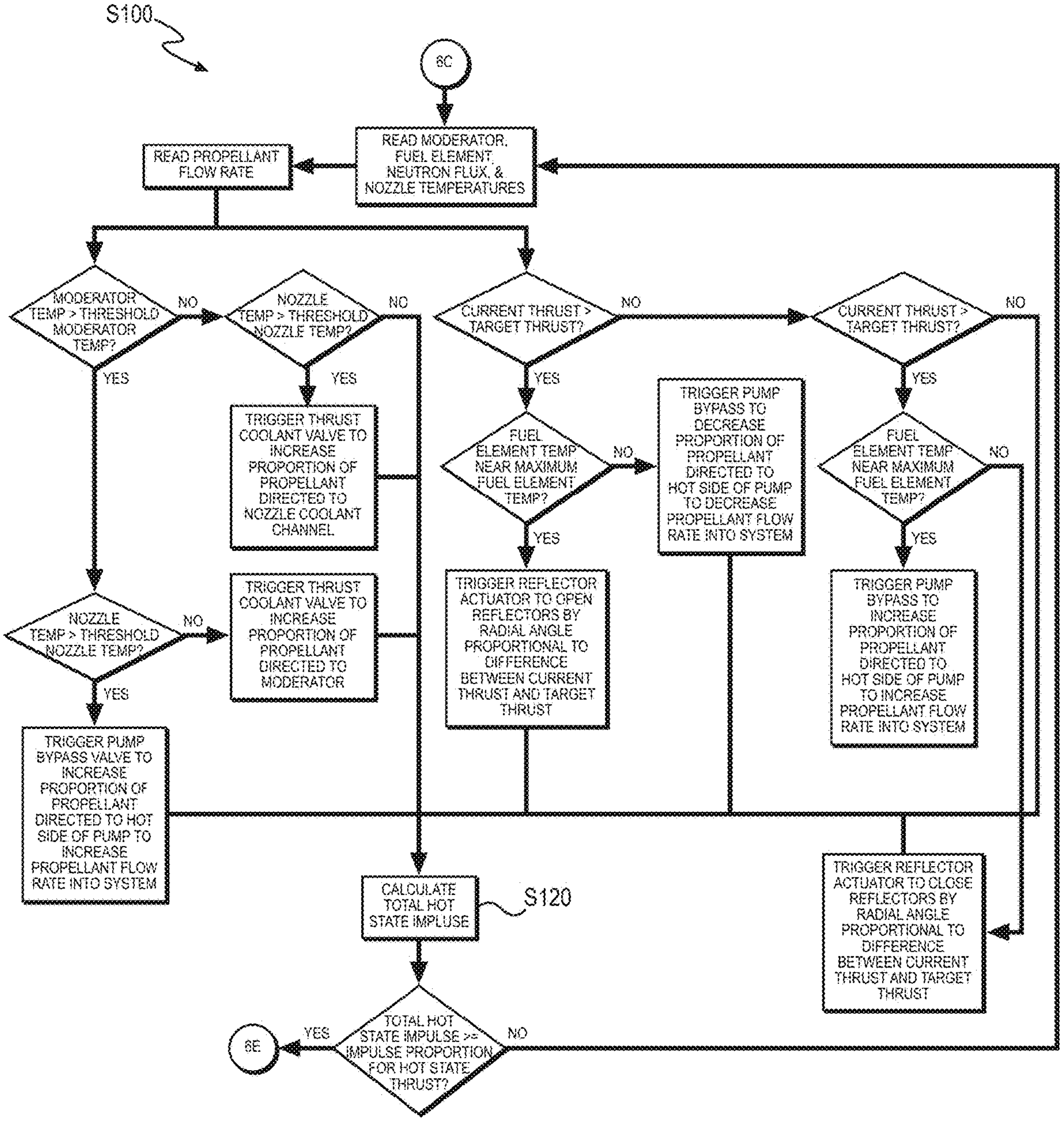

After the startup time period that engine system 100 can occupy a hot thrust state, shown in FIGS. 2C and 6D, in which the fission reaction occupies a critical state and the engine system 100 produces thrust. During the hot thrust state the reflector 156 or array of reflectors 156 occupy a closed position to reflect neutrons within the reactor assembly 120.

During the hot thrust state, the pump, pumps propellant: from a propellant reservoir 178 at a supply temperature; through a cold side 112 of the pump; to a set of moderator coolant channels 134, extending axially within a moderator 132, to cool the moderator 132; to a hot side 114 of the pump 110 to operate the cold side 112 of the pump; through a set of fuel elements to heat the propellant to a first outlet temperature, the set of fuel elements extending axially within the moderator 132 and isolated from the set of moderator coolant channels 134; and out of a thrust nozzle 152 to produce a first thrust; and locating the reflector, arranged about the set of fuel elements and the moderator 132, at a first closed position to reflect neutrons toward the set of fuel elements to maintain a fission rate of the set of fuel elements above a threshold fission rate.

During the hot thrust stage, the controller actuates the thrust-coolant valve 174 to maintain the nozzle, reflectors 156, moderator 132, and fuel elements within an operating temperature range such as by increasing or decreasing a proportion of propellant directed to the moderator coolant channels or nozzle coolant channel as shown in FIG. 6D.

In one implementation, the thrust-coolant valve 174 actuates to direct 50-90% of the flow of propellant from the cold side of the pump to the moderator coolant channel and 10-50% of the flow to the nozzle coolant channel. Additionally, the pump bypass valve 172 actuates to direct 90-100% of the flow of propellant from the outlet 180 to the hot side of the pump and 0-10% of the flow of propellant to the set of fuel elements 122.

In one implementation, the hot thrust stage includes further comprising, pumping a first proportion of the propellant: from the cold side of the pump to a nozzle coolant channel within the thrust nozzle to cool the thrust nozzle; and from nozzle coolant channel to a reflector coolant channel within the reflector to cool the reflector. In this implementation, pumping the propellant to the set of moderator coolant channels to cool the moderator during the first time period includes by the pump: pumping the first proportion of the propellant from the reflector coolant channel to the set of moderator coolant channels; and pumping a second proportion of the propellant, greater than the first proportion, from the pump directly to the set of moderator coolant channels to cool the moderator.

In one implementation, the first proportion is inversely proportional to a moderator temperature of the moderator; and the second proportion is proportional to the moderator temperature of the moderator. Pumping the propellant to the set of moderator coolant channels to cool the moderator during the first time period includes: at an inlet to the set of moderator coolant channels, mixing the first proportion of propellant at a first temperature with the second proportion of propellant at a second temperature less than the first temperature to form a propellant mixture at a third temperature less than a present temperature threshold of the moderator. In another implementation, the first proportion is further proportional to a nozzle temperature of the nozzle and proportional to a reflector temperature of the reflector.

In one implementation, the controller calculates a total engine impulse. The engine system produces: a first proportion of the total engine impulse during the hot thrust state; and a second proportion of the total engine impulse during the cooldown state. The controller can calculate the first and second proportions of total engine impulse during these stages to confirm a target total impulse is produced throughout the engine cycle.

2.6 Engine State: Cooldown

Figure 6E:
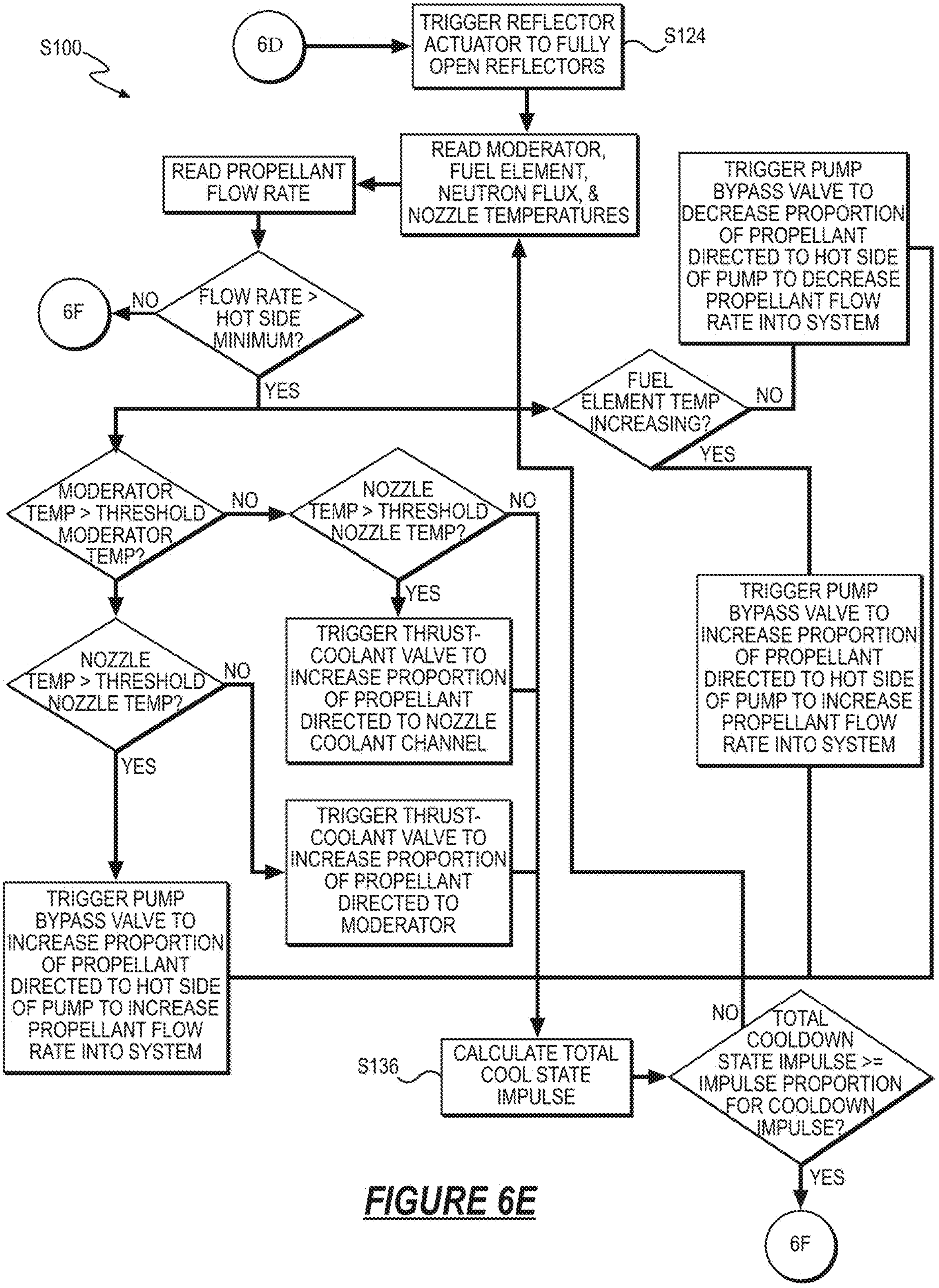

At a second time the engine system 100 occupies a cooldown state, shown in FIGS. 2D and 6E, to reduce a temperature of the engine system 100 and decrease an output of thrust. During the cooldown state, the reflector 156 occupies an open position to leak neutrons out of the reactor assembly 120 and into the external environment (e.g., into space).

For example, the method S100 includes: locating the reflector 156 at a second open position to release neutrons from the nuclear rocket engine and to reduce the fission rate of the set of fuel elements to below the threshold fission rate;

and by the pump, pumping the propellant a) from the propellant reservoir 178 at the supply temperature; b) through the cold side 112 of the pump; c) to the set of moderator coolant channels 134 to cool the moderator 132; d) to the hot side 114 of pump 110 to operate the first side of the pump; e) through the set of fuel elements to cool the set of fuel elements and to heat the propellant to a second outlet temperature less than the first outlet temperature, and f) out of the thrust nozzle 152 to produce a second thrust less than the first thrust. In one implementation, the controller can actuate the thrust-coolant valve 174 to divide the flow of propellant from the cold side 112 of the pump 110 between the moderator coolant channels and the nozzle coolant channel. For example, the thrust-coolant valve can direct 70% of the flow of propellant to the moderator coolant channels and the remaining 30% to the nozzle coolant channel or the thrust-coolant valve can split the flow 50/50 as shown in FIG. 2D.

During the cooldown state the controller can actuate the pump bypass valve 172 such that the pump 110 pumps propellant from the outlet 180 of the moderator coolant channels 134 to the hot side 114 of the pump to operate the pump with the remaining thermal energy in the fluid circuit..

In one implementation, during the cooldown state, the pump can pump a proportion of propellant: from the cold side of the pump to the nozzle coolant channel within the thrust nozzle to cool the thrust nozzle; and from nozzle coolant channel to the reflector coolant channel within the reflector to cool the reflector coolant channel. Pumping the propellant to the set of moderator coolant channels to cool the moderator during the second time period includes, by the pump: pumping the third proportion of the propellant from the reflector coolant channel to the set of moderator coolant channels, the third proportion less than the first proportion; and pumping a fourth proportion of the propellant, greater than the first proportion, from the pump directly to the set of moderator coolant channels to cool the moderator, the fourth proportion greater than the second proportion, wherein a first volume of propellant comprising the first proportion and the second proportion is less than a second volume of propellant comprising the third proportion and the fourth proportion.

2.7 Engine State: Bleed-Off

Figure 6F:
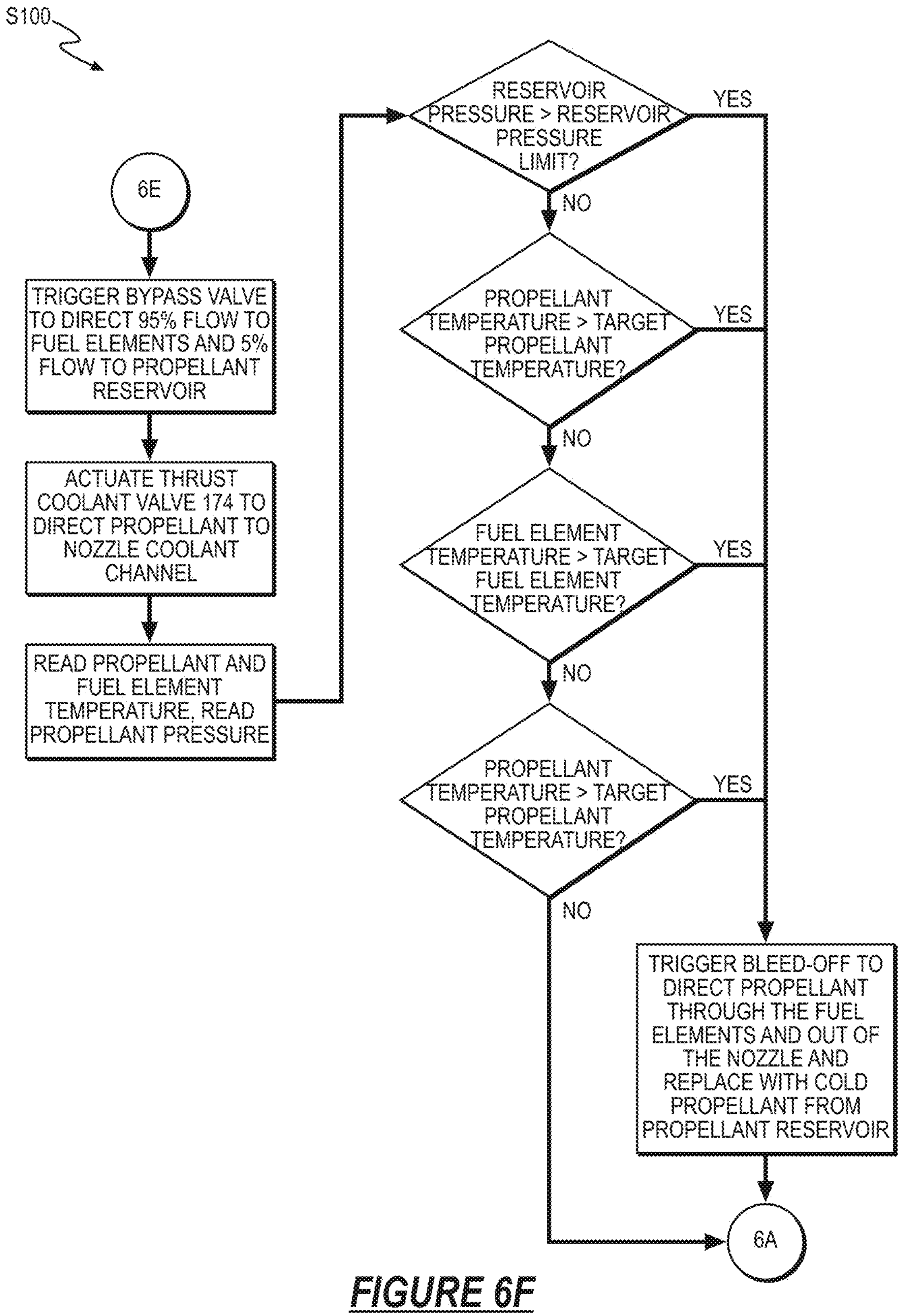

In one implementation, during or after the cooldown state, the engine system can enter a bleed-off state to purge a portion of hot propellant out of the thrust nozzle, as shown in FIGS. 2E and 6F. During this state, the controller can actuate an orifice of the propellant reservoir to introduce a portion of cold propellant from the propellant reservoir 178 into the fluid circuit to lower the average temperature of the propellant and the components within the fluid circuit.

In the bleed-off state, the engine system 100 coordinates positions of the reflectors 156, the thrust-coolant valve 174, and the pump bypass valve 172 to reduce the fission reaction rate within fuel beds 128 of the fuel elements 122. However, fission reactions may persist—at low rate - within the fuel elements 122 in the bleed-off state such that the fuel elements 122 continue to release thermal energy. Therefore, the engine system 100 can intermittently release heated propellant into the fuel elements and out of the nozzle 152 to carry thermal energy (i.e., waste heat) out of the system while introducing cold propellant from the propellant reservoir 178 into the thrust pathway. More specifically, the system can: circulate propellant between the moderator and the reflectors 156 to remove heat from the fuel elements and to radiate this heat into space; and intermittently displace warm propellant in the thrust pathway with cold propellant from the propellant reservoir 178, thereby limited thermal energy buildup within the fuel elements, maintaining substantially uniform temperatures across the moderator and the fuel elements, and limiting the fission reaction rate within the fuel elements.

Additionally, during the bleed-off state, the controller can actuate the pump bypass valve 172 to direct a portion of propellant from the outlet 180 of the moderator coolant channels back into the propellant reservoir 178. For example, the engine system can include a fluid circuit connecting the outlet 180 of the moderator coolant channels to the propellant reservoir 178 and the controller actuates the pump bypass valve 172 to direct 5% of the flow of propellant to the pump bypass valve to the propellant reservoir 178. The controller actuates the pump bypass valve to direct propellant to the propellant reservoir to re-pressurize the propellant reservoir. Therefore, the propellant reservoir maintains a pressure sufficient to continue circulating propellant throughout the fluid circuit during bleed-off, without the use of an electric pump.

During the bleed-off state, controller reads the outputs of sensors to detect: the propellant temperature, the fuel element temperature, the propellant pressure, and the propellant reservoir pressure. In response to the propellant reservoir pressure over a threshold pressure limit or the propellant or fuel element temperature over a target temperature, or a propellant pressure above a target propellant pressure the controller can bleed-off a portion of propellant from the thrust nozzle and replace the portion of hot propellant with a portion of cold propellant from the propellant reservoir.

In one implementation, in response to the reservoir pressure, propellant temperature, fuel element temperature, and propellant pressure within respective target ranges, the controller can: trigger the pump bypass valve to reduce a flow of propellant to the propellant reservoir; and trigger the circulation valve to direct flow to the nozzle coolant channel.

2.8 Engine State: Circulation

After the cooldown state, the engine system 100 can enter a circulation state, shown in FIG. 2F to circulate propellant throughout the fluid circuit. During the circulation state, the reflectors 156 remain in the open position and the engine system 100 circulates propellant at a low propellant flow rate through the engine system 100 via the second pump 184 to maintain the system at a nominal temperature range. Therefore, the system can: circulate propellant between the moderator and the reflectors 156 to collect thermal energy from the fuel elements and the moderator through convection with the circulating propellant and to release the energy into space via radiation through the reflectors 156.

The circulation state includes: triggering a thrust-coolant valve 174 to transition to a full coolant position, the thrust-coolant valve in the full coolant position configured to direct propellant to the nozzle coolant channel; triggering a pump bypass valve to transition to a full pump bypass position, the pump bypass valve in the full pump bypass position configured to direct propellent to a circulation valve 182; triggering the circulation valve 182 to transition to a circulation position, the circulation valve 182 in the circulation position configured to direct propellant to the thrust-coolant valve; and activating the second pump 184. The second pump 184, circulates the propellant: through the nozzle coolant channel; through the reflector coolant channel; through the moderator coolant channel; through the pump bypass valve in the full pump bypass position; through the circulation valve 182 in the open circulation position; through the thrust-coolant valve in the full coolant position; and back through the nozzle coolant channel. No thrust is produced in the circulation state.

2.9 Engine State: Re-Start

Following a period of dormancy or quiescence, the engine system 100 can enter a re-start state to increase the thrust output by the engine system 100.In the re-start state, the reflectors 156 are actuated in the open position. Cold propellant is directed from the reservoir 178 through the thrust-coolant valve 174 and circulated through the nozzle coolant channel 154, reflectors 156, and moderator 134, subsequently redirected by the bypass valve 172 through the fuel elements 122 and thrust nozzle 152 establishing a temperature and pressure equilibrium within the engine. The controller then triggers the engine system to enter the conditioning state shown in FIG. 6B. Additional Controls As shown in FIGS. 6A, 6B, 6C, 6D, and 6E the controller implements a series of closed loop controls to maintain the components of the system within a target operating temperature range and produce a target thrust. The engine system can transition between a set of engine states shown in FIG. 6A, including: an initial conditioning state shown in FIG. 6B, a bootstrapping state shown in FIG. 6C, a hot thrust state shown in FIG. 6D, a cooldown state shown in FIG. 6E, and a bleed-off state shown in FIG. 6F.

The controller can access a target thrust; access a temperature of a fuel element in the set of fuel elements; access a flow rate through the first element; calculate a current thrust based on the temperature of the fuel element and the flow rate through the fuel element; and access a current angle of the reflector. Responsive to the current thrust less than the target thrust the controller can trigger a reflector actuator to actuate the reflector to a second angle greater than the current angle to release more neutrons to an external environment to decrease the current thrust to the target thrust. Responsive to the current thrust greater than the target thrust, the controller can trigger the reflector actuator 186 to actuate the reflector to a third angle lower than the current angle to reflect more neutrons into the set of fuel elements to increase the current thrust to the target thrust.

To actuate the reflector from the current angle to a second angle the controller can: calculate a target energy flux proportional to the target thrust; calculate a second angle of the reflector defining a second cross-section, greater than a first cross-section at the current angle, of neutron-reflecting material facing the set of fuel elements the second cross-section of neutron-reflecting material reflecting a frequency of incident neutrons into the set of fuel element to achieve the target energy flux; and trigger the actuator to actuate the reflector from the current angle to the second angle.

The controller can additionally adjust the temperature of a component of the engine system 100 to a target temperature based on a target thrust. For example, if the target thrust defines a maximal thrust, the controller can calculate a target temperature for the fuel element 122 near a maximal fuel element 122 temperature to produce the target thrust. The controller can additionally calculate a target temperature for the moderator 132 below within the operating temperature range of the moderator 132 that allows the fuel element 122 to maintain the maximal fuel element 122 temperature. The controller can: access the target thrust value; read a current value of the temperature of the component from a signal output by a temperature sensor of that component; and actuate a valve to increase or decrease the current temperature to the target temperature of the component.

The controller can actuate the pump bypass valve 172 to adjust the propellant flow rate of propellant through the engine system 100. For example, the pump 110 pumps propellant: from the propellant reservoir 178 occupying the supply temperature; through the cold side 112 of the pump 110 operating at a first rotation rate thereby defining a first propellant flow rate of the propellant; directly to the set of moderator coolant channels 134 at the supply temperature to cool the moderator 132 and heat the propellant to a moderator 132 exhaust temperature; to the hot side 114 to release thermal energy to the hot side of the pump to increase the first rotation rate to a second rotation rate of the cold side of the pump and the hot side of the pump to output propellant at a second flow rate greater than the first flow; and through the set of fuel elements occupying an element entry temperature less than the moderator exhaust temperature and the second flow rate higher than the first flow rate to cool a set of nuclear fuel particles within each fuel element of the set of fuel elements. Therefore, by actuating the pump bypass valve 172, the controller cools the set of nuclear fuel particles with a higher propellant flow rate of propellant.

In another example, the pump 110 pumps propellant, during a third time period: from an outlet of the set moderator coolant channels 134; through a pump bypass valve 172 without operating the pump; directly to the set of fuel elements at a first propellant flow rate; and out of the thrust nozzle to produce a third thrust. During a fourth time period, the pump 110 pumps propellant: from the outlet of the set of moderator coolant channels 134; through the pump bypass valve 172 without operating the pump; directly to the set of fuel elements at a second propellant flow rate lower than the first propellant flow rate; and out of the thrust nozzle to produce a fourth thrust less than the third thrust. Therefore, the propellant flow rate within the engine system 100 decreases due to the position of the pump bypass valve 172 allowing propellant to bypass the hot side 114 of the pump.

Further, responsive to a temperature of the reflector above a reflector operating temperature range, the controller can: trigger a nozzle coolant bypass valve to transition to a reflector coolant position configured to direct propellant from the cold side of the pump to the reflector coolant channel; and pump propellant a) from the propellant reservoir, b) through the cold side of the pump at a first flow rate, c) through a nozzle coolant bypass valve, and d) directly to the reflector coolant channel to cool the reflector.

3 Conclusion

As a person skilled in the art will recognize from the previous detailed description and from the figures and claims, modifications and changes can be made to the embodiments of the invention without departing from the scope of this invention as defined in the following claims.

We claim:

1. A method comprising:

during a first time period:

by a pump, pumping a propellant:

from a propellant reservoir at a supply temperature;

through a cold side of the pump;

to a set of moderator coolant channels, extending axially within a moderator, to cool the moderator;

to a hot side of the pump to operate the cold side of the pump;

through a set of fuel elements to heat the propellant to a first outlet temperature, the set of fuel elements extending axially within the moderator and isolated from the set of moderator coolant channels; and out of a thrust nozzle to produce a first thrust; and during a second time period:

by the pump, pumping the propellant:

from the propellant reservoir at the supply temperature;

through the cold side of the pump;

to the set of moderator coolant channels to cool the moderator;

to the hot side of the pump to operate the cold side of the pump;

through the set of fuel elements to cool the set of fuel elements and to heat the propellant to a second outlet temperature less than the first outlet temperature; and out of the thrust nozzle to produce a second thrust less than the first thrust.

2. The method of claim 1, further comprising:

during the first time period:

locating a reflector, arranged about the set of fuel elements and the moderator, at a first closed position to reflect neutrons toward the set of fuel elements to maintain a fission rate of the set of fuel elements above a threshold fission rate; and during the second time period:

locating the reflector at a second open position to release neutrons from a nuclear rocket engine and to reduce the fission rate of the set of fuel elements to below the threshold fission rate.

* * * * *